(12) United States Patent
Katsurahira et al.

(10) Patent No.: US 8,212,550 B2
(45) Date of Patent: Jul. 3, 2012

(54) POSITION INDICATOR, CIRCUIT COMPONENT AND INPUT DEVICE

(75) Inventors: Yuji Katsurahira, Kazo (JP); Hiroyuki Fujitsuka, Saitama-ken (JP); Kimiyoshi Hosaka, Saitama-ken (JP)

(73) Assignee: Wacom Co., Ltd., Saitama (JP)

( * ) Notice: Subject to any disclaimer, the term of this patent is extended or adjusted under 35 U.S.C. 154(b) by 357 days.

(21) Appl. No.: 12/684,428

(22) Filed: Jan. 8, 2010

(65) Prior Publication Data
US 2010/0207607 A1 Aug. 19, 2010

(30) Foreign Application Priority Data

Feb. 17, 2009 (JP) ................................ 2009-033978

(51) Int. Cl.
*G01B 7/30* (2006.01)
*G01R 33/00* (2006.01)
*G06F 3/033* (2006.01)
(52) U.S. Cl. ............... 324/207.11; 178/19.03; 178/18.01
(58) Field of Classification Search ............. 324/207.25, 324/207.11; 178/18.07, 19.01, 19.03
See application file for complete search history.

(56) References Cited

U.S. PATENT DOCUMENTS

| 5,644,108 A | * | 7/1997 | Katsurahira et al. | ........ 178/18.07 |
| 2008/0180092 A1 | * | 7/2008 | Fukushima et al. | ..... 324/207.16 |

FOREIGN PATENT DOCUMENTS

| JP | 8030374 A | 2/1996 |
| JP | 8202489 A | 8/1996 |
| JP | 10133807 A | 5/1998 |
| JP | 2001255992 A | 9/2001 |

* cited by examiner

*Primary Examiner* — Gregory J Toatley
*Assistant Examiner* — Feba Pothen
(74) *Attorney, Agent, or Firm* — Seed IP Law Group PLLC

(57) ABSTRACT

A position indicator includes a tubular core member comprising a first magnetic core, a second magnetic core, a first coil, a second coil, a rod, a pen-pressure detecting element, a capacitor, and a switch. At least one of the first and second magnetic cores includes a recessed portion extending in the axial direction so as to form a through-hole when the first and second magnetic cores are combined, and the rod is inserted through the hole. The first coil is wound around the tubular core member, and the second coil is wound around the second magnetic core. The pen-pressure detecting element detects a pressure applied to an end of the rod (i.e., the pen tip). The capacitor is connected to the first coil to form a resonant circuit. The switch controls "on" and "off" states of the second coil to calculate a rotation angle of the position indicator.

17 Claims, 13 Drawing Sheets

POSITION INDICATOR, CIRCUIT COMPONENT AND INPUT DEVICE

CROSS REFERENCES TO RELATED APPLICATIONS

The present invention claims priority under 35 U.S.C. §119 from Japanese Patent Application JP 2009-033978 filed in the Japanese Patent Office on Feb. 17, 2009, the entire contents of which being incorporated herein by reference.

BACKGROUND OF THE INVENTION

1. Field of the Invention

The present invention relates to a position indicator whose rotation angle with respect to an axial direction can be detected, a circuit component used in the position indicator, and an input device having the position indicator.

2. Description of the Related Art

In recent years, input devices which operate based on electromagnetic resonance technology have been used as input devices for a personal computer and the like. Such input devices generally comprise a pen-like position indicator and a position detecting device having an input surface, on which an input operation is performed using the position indicator. An input operation using the position indicator may include, for example, a pointing operation, a handwritten character input operation, or a hand-drawn illustration input operation.

Among these input devices, there is a kind of input device on which not only a pointing operation, a handwritten character input operation, and the like, can be performed, but also rotation and tilt of the position indicator can be input as data depending on how the position indicator is held and how the position indicator is twisted by the hand of a user.

An example of such a kind of the input device is disclosed in Japanese Unexamined Patent Application Publication No. H08-30374 (referred to as "Patent Document 1" hereinafter). The input device disclosed in Patent Document 1 includes a position indicator having two cylindrical magnetic cores. The two magnetic cores are disposed so that a midpoint thereof is matched with a bar-like rod (providing a pen-tip at its distal end) of the position indicator.

A control coil is wound around one of the two magnetic cores. Further, a transmission coil is wound around the two magnetic cores so that the two magnetic cores are bundled together. The transmission coil and a capacitor constitute a resonant circuit. Further, by controlling the opening/closing of the control coil, distribution of the magnetic flux passing through the transmission coil is changed, to thereby detect rotation angle and tilt angle of the position indicator.

Another example of the input device capable of detection rotation/tilt of the position indicator is disclosed in Japanese Unexamined Patent Application Publication No. H08-202489 (referred to as "Patent Document 2" hereinafter). The input device disclosed in Patent Document 2 includes a position indicator having two parallelepiped-shaped magnetic cores. The two magnetic cores are disposed so that they sandwich a pen-tip of the position indicator. When the two magnetic cores are combined, the axis in the longitudinal direction of the two magnetic cores is matched with the pen-tip.

Each of the magnetic cores has a control coil transversely wound therearound. Further, a transmission coil is transversely wound around the two magnetic cores so that the two magnetic cores are bundled together. The axis of the transmission coil, the position of the pen-tip, the axis of the position indicator, and the axis in the longitudinal direction of the two magnetic cores bundled together are all aligned with each other. Further, the input device includes a tablet, which has a detection circuit for detecting a tilt-detecting signal generated from the control coil(s), and a control circuit for determining the tilt angle of the position indicator based on the result detected by the detection circuit.

However, in the position indicator disclosed in Patent Document 1, since the two cylindrical magnetic cores are disposed side by side in a direction perpendicular to the axis of the position indicator, the position indicator has a relatively large outer diameter.

Further, when the bar-like rod (providing a pen-tip at its distal end) is passed through between the two magnetic cores, the two magnetic cores need to be sufficiently spaced apart from each other to prevent the rod, which passes therebetween, from interfering with the coil wound around each magnetic core. Thus, it was difficult to reduce the outer diameter of the position indicator. Still further, when the rod is not passed between the two magnetic cores, in order to connect the rod to a pen pressure detection switch provided at an end portion of the magnetic cores, to additionally detect the pen pressure, the rod has to be formed in a special (e.g., bent) shape, or an adapter has to be arranged between the rod and the switch.

Further, in the position indicator disclosed in Patent Document 2, in order to achieve a configuration capable of additionally detecting the pen pressure, a clearance greater than the diameter of the rod has to be provided between the two magnetic cores. Thus, a clearance of a predetermined size is formed between the two magnetic cores, thereby degrading the performance of the magnetic cores.

SUMMARY OF THE INVENTION

In view of the aforesaid problems, an object of the present invention is to make it possible to detect the rotation (roll) of the position indicator with respect to an axial direction, and to detect the pen pressure without having to form the rod in a special shape.

A position indicator according to a first aspect of the present invention includes: a tubular core member; a first coil; a second coil; a substantially bar-like rod; a pen-pressure detecting element; a capacitor; and a switch. The tubular core member has a through-hole. The tubular member is formed by combining a substantially bar-like first magnetic core with a substantially bar-like second magnetic core in a manner in which they face each other in a transversal direction thereof so that the through-hole is formed therebetween. The first coil is wound around the tubular core member. The second coil is wound around the second magnetic core, which forms the tubular core member. The substantially bar-like rod is inserted into the through-hole of the tubular core member. The pen-pressure detecting element detects a pressure applied to an end of the rod. The capacitor is connected to the first coil and is provided for forming a resonant circuit. The switch controls on/off of the second coil.

A circuit component according to a second aspect of the present invention includes: a tubular core member; a first coil; and a second coil. The tubular core member has a through-hole and is formed by combining a substantially bar-like first magnetic core with a substantially bar-like second magnetic core such that they face each other in a transversal direction thereof so that the through-hole is formed. The first coil is wound around the tubular core member. The second coil is wound around the second magnetic core.

An input device according to a third aspect of the present invention includes: a position indicator and a position detecting device.

The position indicator includes: a tubular core member; a first coil; a second coil; a substantially bar-like rod; a pen-pressure detecting element; a capacitor; and a switch. The tubular core member has a through-hole. The tubular core member is formed by combining a substantially bar-like first magnetic core with a substantially bar-like second magnetic core such that they face each other in a transversal direction thereof thereby forming the through-hole therebetween. The first coil is wound around the tubular core member. The second coil is wound around the second magnetic core. The substantially bar-like rod is inserted into the through-hole of the tubular core member. The pen-pressure detecting element detects a pressure applied to an end of the rod. The capacitor is connected to the first coil and is provided for forming a resonant circuit. The switch controls on/off of the second coil.

The position detecting device includes: an input surface on which the position indicator indicates a position, a coordinate input circuit, and a rotation angle calculating circuit. The coordinate input circuit obtains coordinates of the position indicated on the input surface based on distribution of a magnetic field emitted from the tubular core member of the position indicator. The rotation angle calculating circuit calculates a rotation angle of the position indicator around (about) an axis in a direction perpendicular to the input surface based on coordinates obtained when the switch is in a closed state and in an open state.

According to the present invention, it is possible to detect the rotation (roll) of the position indicator with respect to the axial direction of the position indicator and to also detect the pen pressure with a bar-like rod.

DETAILED DESCRIPTION OF THE PREFERRED EMBODIMENT(S)

Figure 1:
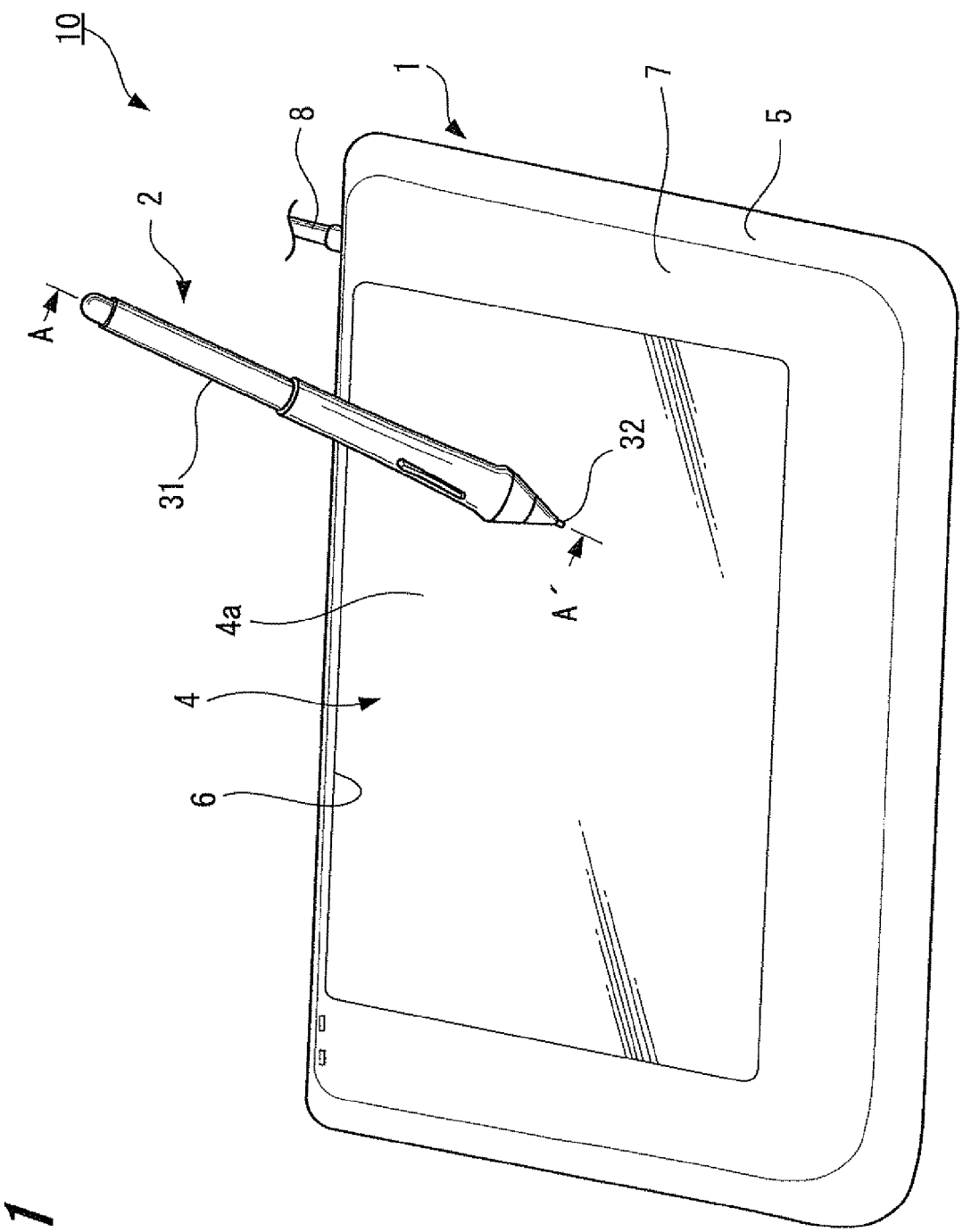
FIG. 1 is a perspective view showing an input device according to an embodiment of the present invention.

A position indicator and an input device according to a first embodiment of the present invention will be described below with reference to FIGS. 1 to 14B. Note that, in the drawings, like components are denoted by like numerals.

Description will be given in the following order:
1. Configuration of the First Embodiment
2. Operation of the First Embodiment
3. Modifications

1. Configuration of the First Embodiment

Input Device

First, a brief description of an input device 10 according to a first embodiment of the present invention will be set forth below with reference to FIG. 1.

The input device 10 according to the present embodiment includes a position detecting device 1 and a position indicator 2 that inputs information to the position detecting device 1. The position indicator 2 indicates its own position on the position detecting device 1 based on the electromagnetic resonance technology.

[Position Detecting Device]

The configuration of the position detecting device 1 will be described below.

The position detecting device 1 includes a detection section 4 for detecting the position indicated by the position indicator 2, and a case 5 for housing the detection section 4. The case 5 is a substantially rectangular parallelepiped-shaped case with a thin wall. The case 5 includes an upper case 7 and a lower case (not shown) coupled with the upper case 7. The upper case 7 has an opening 6 through which an input surface 4a of the detection section 4 is exposed.

The position detecting device 1 is electrically connected to an external device (not shown), such as a personal computer, a PDA (Personal Digital Assistant), and the like, through a cable 8. The position detecting device according to the present invention may also be integrated with the external device such as a personal computer and the like.

The position indicated on the input surface 4a of the detection section 4 by the position indicator 2 performing a pointing operation is detected by the position detecting device 1. The position detecting device 1 transmits position information representing the position indicated by the pointing operation to the external device. Thus, based on the received position information of the position indicator 2, a hand-drawn illustration input operation, a handwritten character input operation or the like can be performed using various software installed on the external device.

[Example of Circuit Configuration of Position Detecting Device]

Figure 2:
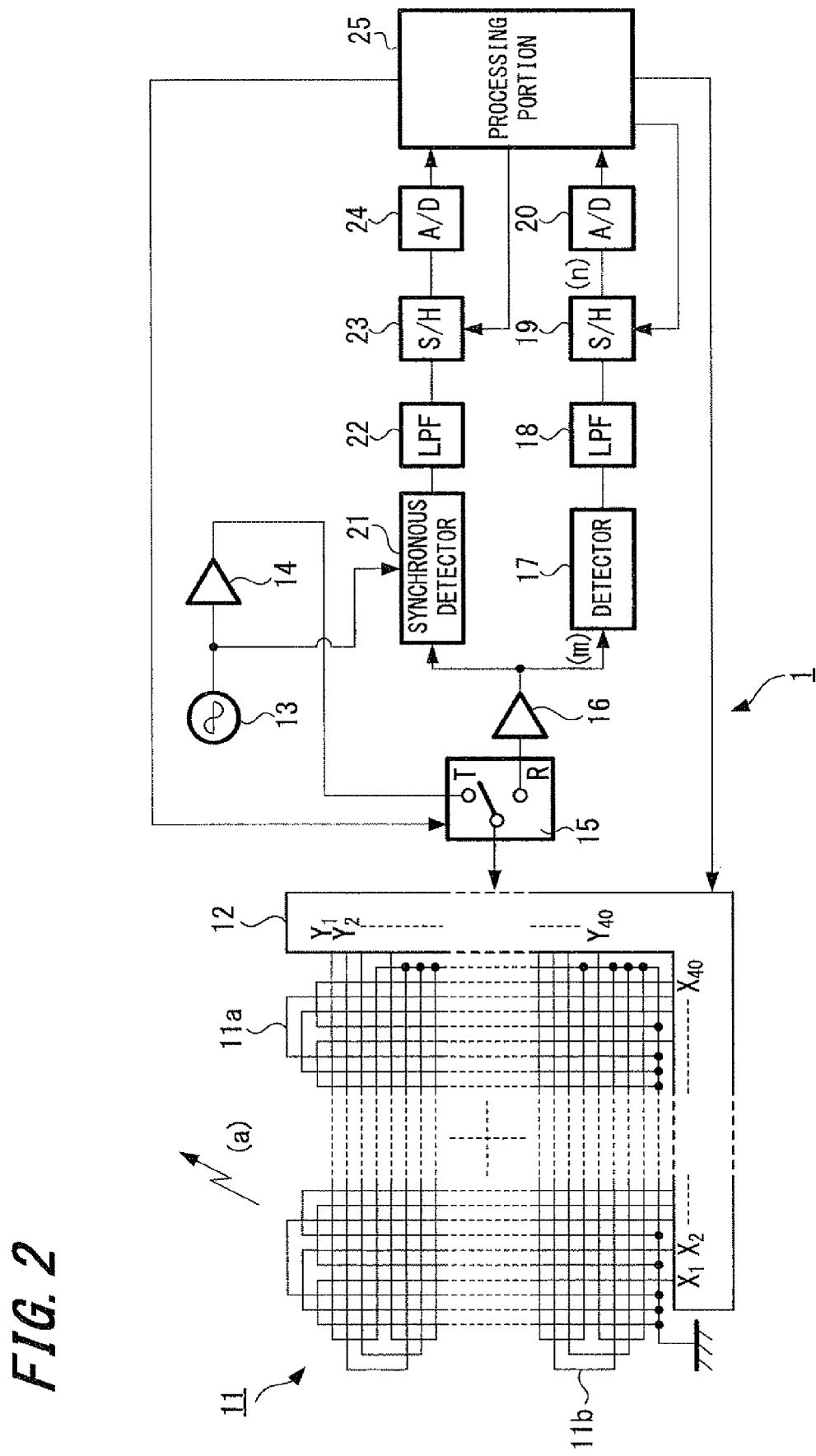
FIG. 2 is a block diagram schematically showing a circuit configuration of a position detecting device of the input device according to the aforesaid embodiment.

Next, the circuit configuration of the position detecting device 1 will be described below with reference to FIG. 2.

The detection section 4 of the position detecting device 1 (see FIG. 1) has a position detecting coil 11 configured by superimposing an X-axis direction loop coil group 11a and a Y-axis direction loop coil group 11b. Each of the loop coil groups 11a, 11b comprises, for example, forty rectangular loop coils. The loop coils of each of the loop coil group 11a and loop coil group 11b are sequentially overlapped with each other so that the loop coils are shifted from each other at an equal interval.

The position detecting device 1 is provided with a selecting circuit 12 to which the X-axis direction loop coil group 11a and the Y-axis direction loop coil group 11b are connected. The selecting circuit 12 sequentially selects a loop coil from the loop coil group 11a and loop coil group 11b.

The position detecting device 1 further includes an oscillator 13, a current driver 14, a switching circuit 15, a receiving amplifier 16, a detector 17, a low-pass filter 18, a S/H circuit 19, an A/D conversion circuit 20, a synchronous detector 21, a low-pass filter 22, a S/H circuit 23, an A/D conversion circuit 24, and a processing portion 25.

The oscillator 13 generates an AC signal having a frequency f0, and supplies the AC signal to the current driver 14 and the synchronous detector 21. The current driver 14 converts the AC signal supplied from the oscillator 13 into a current and sends the current to the switching circuit 15. The switching circuit 15 switches the connection of the loop coil selected by the selecting circuit 12 between two terminals to be connected (i.e., a transmission side terminal T and a reception side terminal R) under the control of the processing portion 25, which is to be described later. Of the terminals to be connected, the transmission side terminal T has the current driver 14 connected thereto, and the reception side terminal R has the receiving amplifier 16 connected thereto.

The induced voltage generated by the loop coil selected by the selecting circuit 12 is supplied to the receiving amplifier 16 through the selecting circuit 12 and the switching circuit 15. The receiving amplifier 16 amplifies the induced voltage supplied from the loop coil, and sends the amplified induced voltage to the detector 17 and the synchronous detector 21.

The detector 17 detects the induced voltage generated by the loop coil (i.e., the detector 27 detects a received signal) and sends the detected signal to the low-pass filter 18. The low-pass filter 18, which has a cut-off frequency sufficiently lower than the frequency f0, converts the signal output from the detector 17 into a DC signal, and sends the DC signal to the S/H circuit (sample-and-hold circuit) 19. The S/H circuit 19 holds a voltage value of the signal output from the low-pass filter 18 at a predetermined timing (more specifically, at a predetermined time during a reception period), and sends the held value to the A/D conversion circuit (analog to digital conversion circuit) 20. The A/D conversion circuit 20 analog/digital converts the value output from the S/H circuit 19, and outputs the result to the processing portion 25.

The synchronous detector 21 synchronously detects the output signal from the receiving amplifier 16 with the AC signal from the oscillator 13, and sends a signal, whose level varies corresponding to the phase difference between the both signals, to the low-pass filter 22. The low-pass filter 22, which has a cut-off frequency sufficiently lower than the frequency f0, converts the signal output from the synchronous detector 21 into a DC signal, and sends the DC signal to the S/H circuit (sample-and-hold circuit) 23. The S/H circuit 23 holds a voltage value of the output signal from the low-pass filter 22 at a predetermined timing, and sends the held value to the A/D conversion circuit (analog to digital conversion circuit) 24. The A/D conversion circuit 24 analog/digital converts the value output from the S/H circuit 23, and outputs the result to the processing portion 25.

The processing portion 25 controls the respective sections of the position detecting device 1. Specifically, the processing portion 25 respectively controls the selecting operation of the loop coil performed by the selecting circuit 12, the switching operation performed by the switching circuit 15, and the determination of the timing at which the S/H circuits 19 and 23 hold the voltage value. Based on the signals input from the A/D conversion circuits 20 and 24, the processing portion 25 makes the X-axis direction loop coil group 11a and the Y-axis direction loop coil group 11b transmit an electromagnetic wave for a predetermined period.

Due to induction of the electromagnetic wave transmitted from the position indicator 2, induced voltages are generated by the respective loop coils of the X-axis direction loop coil group 11a and Y-axis direction loop coil group 11b. Based on the level of the induced voltages generated by the respective loop coils of the X-axis direction loop coil group 11a and Y-axis direction loop coil group 11b, the processing portion 25 calculates the coordinate values of the position indicated by the position indicator 2 in both the X-axis direction and the Y-axis direction, a rotation angle of the position indicator 2 around an axis in the direction perpendicular to the input surface 4a, and the like.

[Position Indicator]

Figure 3:
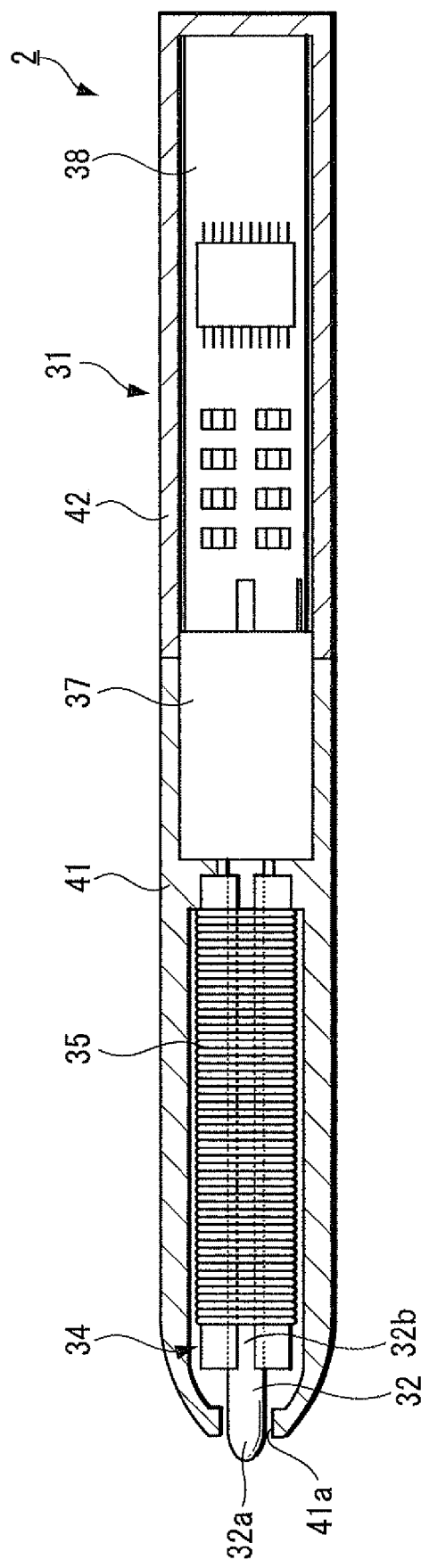
FIG. 3 is a cross section taken along line A-A' of the position indicator shown in FIG. 1.

A brief description of the position indicator 2 will be set forth below with reference to FIG. 3.

The position indicator 2 has a resonant circuit (see FIG. 6), which resonates with the electromagnetic wave of a specific frequency transmitted from the position detecting device 1. By generating the induced voltage in the resonant circuit, the position indicator 2 transmits an electromagnetic wave of frequency f0 to the position detecting device 1 to indicate its own position with respect to the position detecting device 1.

The position indicator 2 includes a case 31 (as an example of an exterior component), a rod 32, a tubular core member 34, a first coil 35, a second coil 36 (see FIG. 4), a variable capacitor 37 (as an example of a pen-pressure detecting element), and a printed circuit board 38. The tubular core member 34, the first coil 35, and the second coil 36 form a circuit component of the present invention.

The case 31 (as the exterior component of the position indicator 2) comprises, for example, a bottomed cylindrical case with one end thereof closed. The case 31 includes a first case 41 and a second case 42. The first case 41 and second case 42 are coupled with each other in the axial direction. One end in the axial direction of the first case 41 is substantially cone-shaped, and an opening 41a is formed on the tip of the cone-shaped end. Further, an opening is formed on the other end in the axial direction of the first case 41. The rod 32, the tubular core member 34, and the variable capacitor 37 are arranged inside the first case 41 in the illustrated example.

The second case 42 is a cylindrical case having one end thereof opened and the other end thereof closed. The one end of the second case 42 is fixed to the other end of the first case 41 by a fixing means such as an adhesive or a fixing screw. The printed circuit board 38 having electronic components mounted thereon is fixed inside the second case 42 by a fixing means such as an adhesive or a fixing screw.

The rod 32 is a substantially bar-like member. The rod 32 includes a pen-tip 32a formed at one end in the axial direction and a shaft portion 32b formed continuously from the pen-tip 32a. The pen-tip 32a is substantially cone-shaped. The pen-tip 32a protrudes to the outside of the first case 41 from the opening 41a.

The shaft portion 32b penetrates through a through-hole 34a (see FIG. 4) of the tubular core member 34. A conductive member (not shown) of the variable capacitor 37 is provided at an end portion of the shaft portion 32b opposite the pen-tip 32a. When the user uses the position indicator 2 to apply the pen pressure to the rod 32, the pen pressure is applied to the conductive member through the rod 32.

The capacitance of the variable capacitor 37 changes according to the change of the pressure applied from the outside, and the pen pressure applied to the rod 32 is detected based on the change of the capacitance of the variable capacitor 37.

When there is no pen pressure applied to the rod 32, due to the elastic restoring force of the conductive member and the weight of both the conductive member and the rod 32, the conductive member will move away from one end surface of dielectric of the variable capacitor 37.

[Tubular Core Member]

Next, the tubular core member 34, the first coil 35, and the second coil 36 will be described below with reference to FIGS. 4 and 5.

Figure 4:
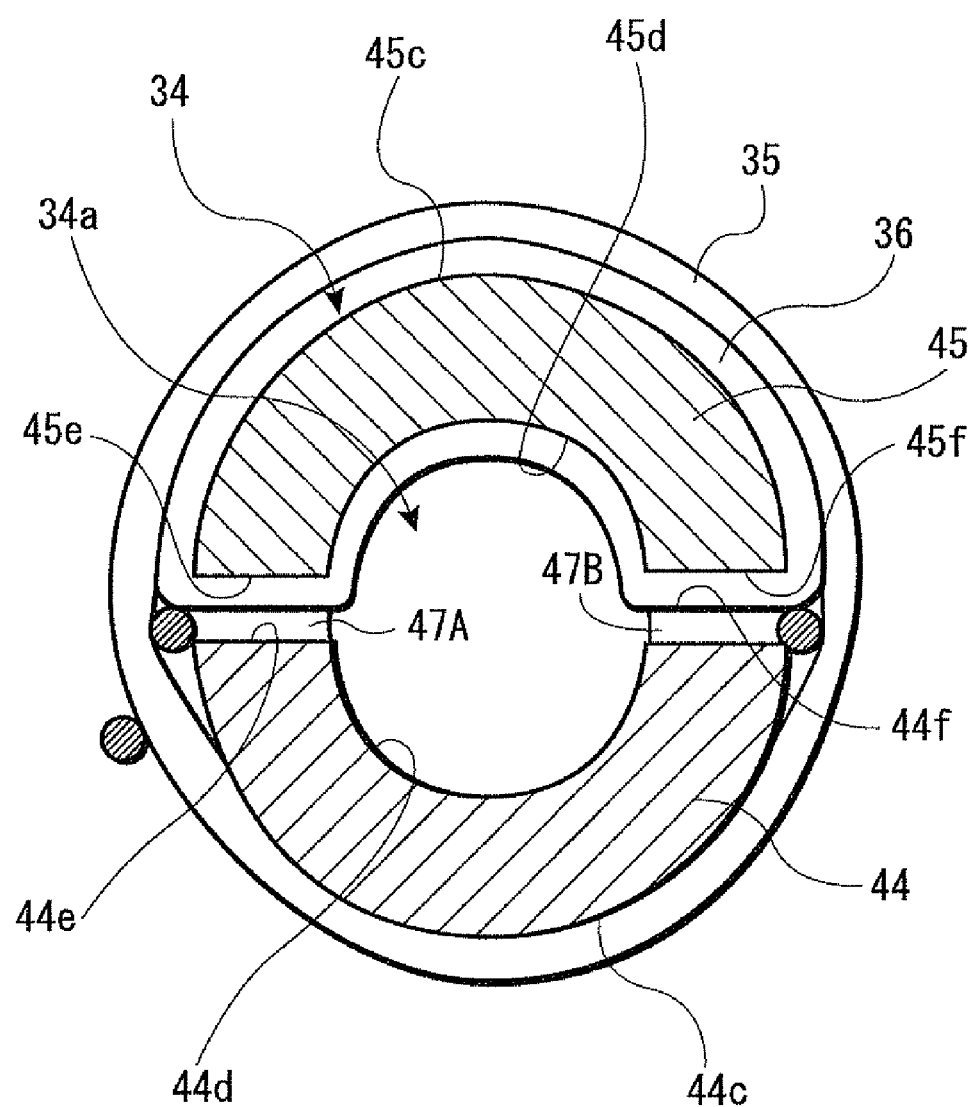
FIG. 4 is a cross section showing a tubular core member of the position indicator according to the aforesaid embodiment.
Figure 5:
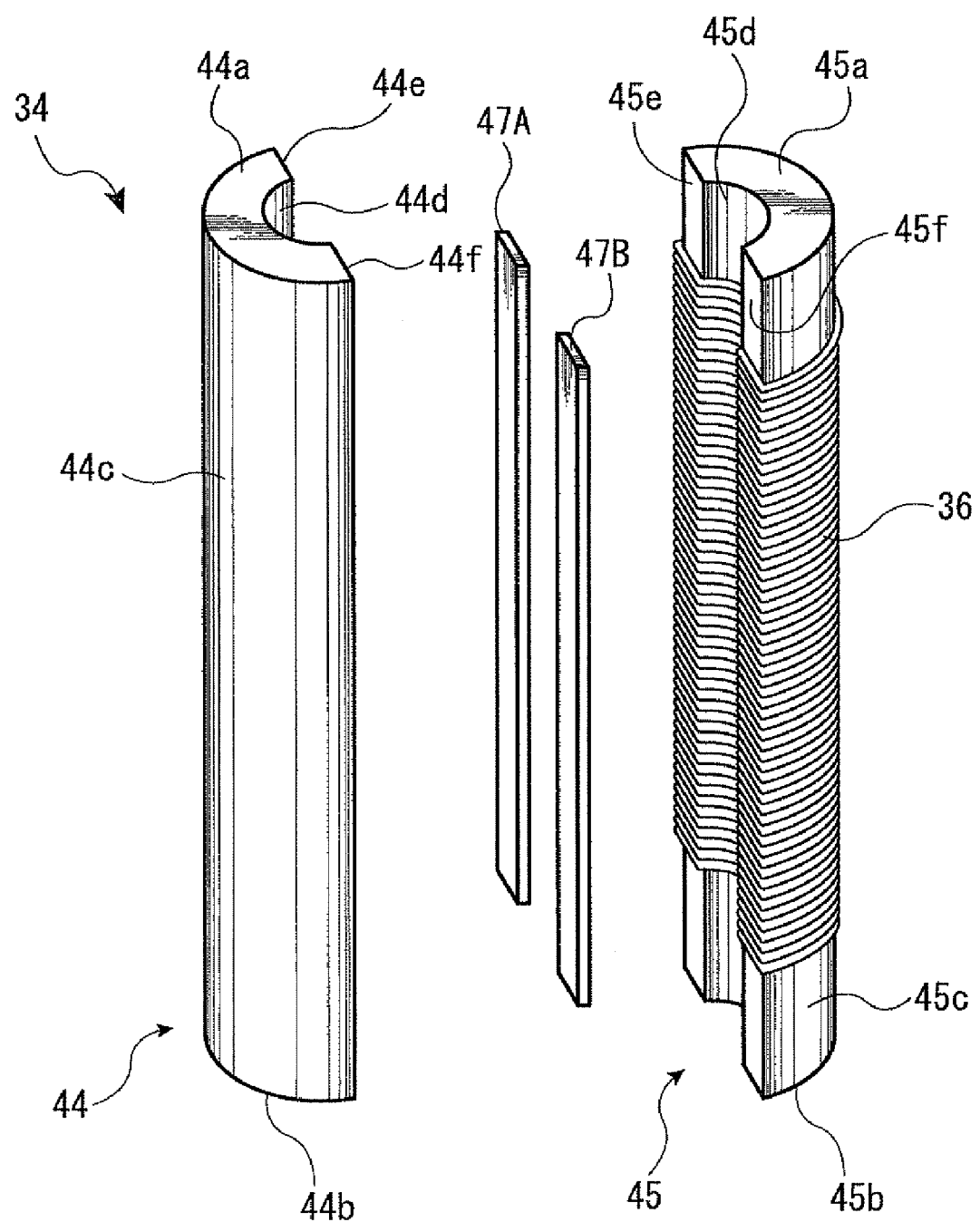
FIG. 5 is an exploded perspective view showing the tubular core member of the position indicator according to the aforesaid embodiment.

As shown in FIGS. 4 and 5, the tubular core member 34 includes a first magnetic core 44 and a second magnetic core 45. The tubular core member 34 has a hollow cylindrical shape with the through-hole 34a. The tubular core member 34 is formed by combining the two magnetic cores 44, 45 in a manner in which they face each other in a direction perpendicular to the axial direction of the case 31 so that the through-hole 34a is formed therebetween. The two magnetic cores 44, 45 are formed in substantially the same shape as each other in the illustrated embodiment. The two magnetic cores 44, 45 are each formed in an arc shape with a central angle of substantially 180°. The two magnetic cores 44, 45 are preferably made of, for example, a ferrite material.

The first magnetic core 44 has two end surfaces 44a, 44b opposite each other, an arc-shaped convex surface 44c, an arc-shaped concave surface 44d, and two flat surfaces 44e, 44f each being perpendicular to the two end surfaces 44a, 44b. Similar to the first magnetic core 44, the second magnetic core 45 has two end surfaces 45a, 45b, an arc-shaped convex surface 45c, an arc-shaped concave surface 45d, and two flat surfaces 45e, 45f.

When the tubular core member 34 is formed by the two magnetic cores 44, 45, the two flat surfaces 44e, 44f of the first magnetic core 44 respectively face the two flat surfaces 45e, 45f of the second magnetic core 45. Further, the convex surface 44c of the first magnetic core 44 and the convex surface 45c of the second magnetic core 45 form the circumferential surface of the tubular core member 34. The concave surface 44d of the first magnetic core 44 and the concave surface 45d of the second magnetic core 45 form the through-hole 34a of the tubular core member 34.

The first coil 35 is wound around the circumferential surface of the tubular core member 34. The second coil 36 is wound around the circumferential surface of the second magnetic core 45. The second coil 36 is wound so that the second coil 36 is curved along the concave surface 45d of the second magnetic core 45. Due to such an arrangement, even if the diameter of the rod 32 and the diameter of the through-hole 34a of the tubular core member 34 are substantially equal to each other, the rod 32 does not interfere with the second coil 36.

Figure 6:
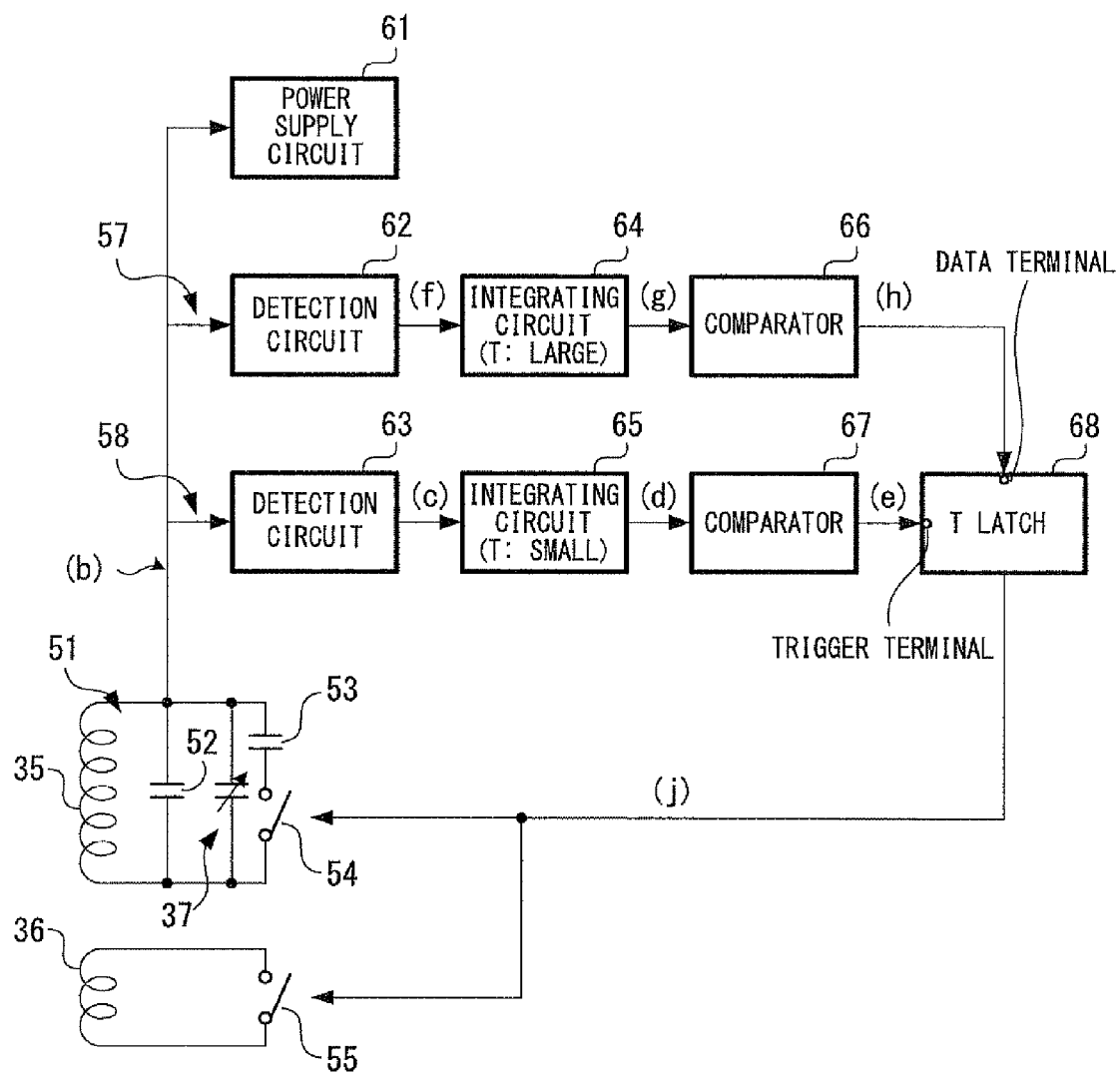
FIG. 6 is a block diagram schematically showing a circuit configuration of the position indicator according to the aforesaid embodiment.

The ends of the first coil 35 and the ends of the second coil 36 are arranged at one end portion of the tubular core member 34 in the longitudinal direction so as to be respectively connected to a capacitor 52 and a switch 55 (see FIG. 6).

The tubular core member 34 is assembled in the following steps. First, the second coil 36 is wound around the circumferential surface of the second magnetic core 45. Then, the first magnetic core 44 and the second magnetic core 45 are disposed so that the flat surfaces 44e, 44f of the first magnetic core 44 and the flat surfaces 45e, 45f of the second magnetic core 45 respectively face each other. At this time, a spacer 47A is interposed between the flat surface 44e and the flat surface 45e, and a spacer 47B is interposed between the flat surface 44f and the flat surface 45f.

The spacers 47A, 47B are provided to prevent or reduce the effect of the current flowing in the second coil 36 on the first magnetic core 44. To serve this purpose, the spacers 47A, 47B are made of a nonmagnetic insulating material. For example, a synthetic resin such as polyethylene terephthalate (PET) can be used as the material of the spacers 47A, 47B. Further, the thickness of the spacers 47A, 47B is preferably within a range of 100-500 μm.

Next, the first coil 35 is wound around the first magnetic core 44 and the second magnetic core 45 so that the convex surface 44c of the first magnetic core 44 and the convex surface 45c of the second magnetic core 45 are continuous with each other. In other words, the first coil 35 is wound around the circumferential surface of the tubular core member 34. With the above steps, the assembly of the tubular core member 34 having the through-hole 34a is completed.

[Example of Circuit Configuration of Position Indicator]

Next, the circuit configuration of the position indicator 2 will be described below with reference to FIG. 6.

The position indicator 2 is provided with a resonant circuit 51. The resonant circuit 51 includes the first coil 35, a capacitor 52 connected in parallel with the first coil 35, and the variable capacitor 37 connected in parallel with the capacitor 52. A capacitor 53 is connected to the resonant circuit 51 through a switch 54.

Further, a switch 55 is connected to the second coil 36 of position indicator 2. The capacitor 53 is provided for compensating for the drop of the inductance of the first coil 35 when closing the switch 55. The capacitance of the capacitor 53 is determined so that the resonance frequency of the resonant circuit 51 becomes a predetermined value (i.e., the frequency of the transmitting signal) independently of the control of the switch 55.

A power supply circuit 61, a detection circuit 62, and a detection circuit 63 are respectively connected to the resonant circuit 51. An integrating circuit 64 is connected to the detection circuit 62, and an integrating circuit 65 is connected to the detection circuit 63. Further, a comparator 66 is connected to the integrating circuit 64, and a comparator 67 is connected to the integrating circuit 65.

The output of the comparator 66 is connected to a data terminal of a latch circuit 68, and the output of the comparator 67 is connected to a trigger terminal of the latch circuit 68. Further, the switches 54, 55 are connected to the latch circuit 68.

The power supply circuit 61 extracts the power from the induced voltage generated by the resonant circuit 51. The power stored in the power supply circuit 61 is supplied to the respective circuits of the position indicator 2.

The detection circuit 62, the integrating circuit 64, and the comparator 66 form a first path 57 for providing output to the data terminal of the latch circuit 68. The detection circuit 62 generates clocks corresponding to the cycle lengths of transmission and intermission of the transmission electromagnetic wave transmitted by the position detecting device 1. Incidentally, the time constant of the integrating circuit 64 is greater than that of the integrating circuit 65.

The comparator 66 compares the output signal of the integrating circuit 64 with a predetermined threshold voltage (for example, 50% of the power voltage), and converts the output signal into a digital signal. In one embodiment, the time constant of the integrating circuit 64 is set such that the output of the comparator 66 rises if the transmission time of the transmission electromagnetic wave transmitted by the position detecting device 1 exceeds a first predetermined time (500 μs, for example).

The detection circuit 63, the integrating circuit 65, and the comparator 67 form a second path 58 for providing output to the trigger terminal of the latch circuit 68. Similar to the detection circuit 62, the detection circuit 63 generates clocks corresponding to the cycle lengths of transmission and intermission of the transmission electromagnetic wave transmitted by the position detecting device 1.

The comparator 67 compares the output signal of the integrating circuit 65 with a predetermined threshold voltage (for example, 50% of the power voltage), and converts the output signal into a digital signal. In one embodiment, the time constant of the integrating circuit 65 is set such that the output of the comparator 67 rises if the transmission time of the transmission electromagnetic wave transmitted by the position detecting device 1 exceeds a second predetermined time (150 μs, for example), which is shorter than the first predetermined time.

2. Operation of the First Embodiment

Operation of the Position Detecting Device

Next, the operation of the position detecting device 1 following the processing flow of the processing portion 25 will be described below with reference to FIGS. 7 and 8.

Figure 7:
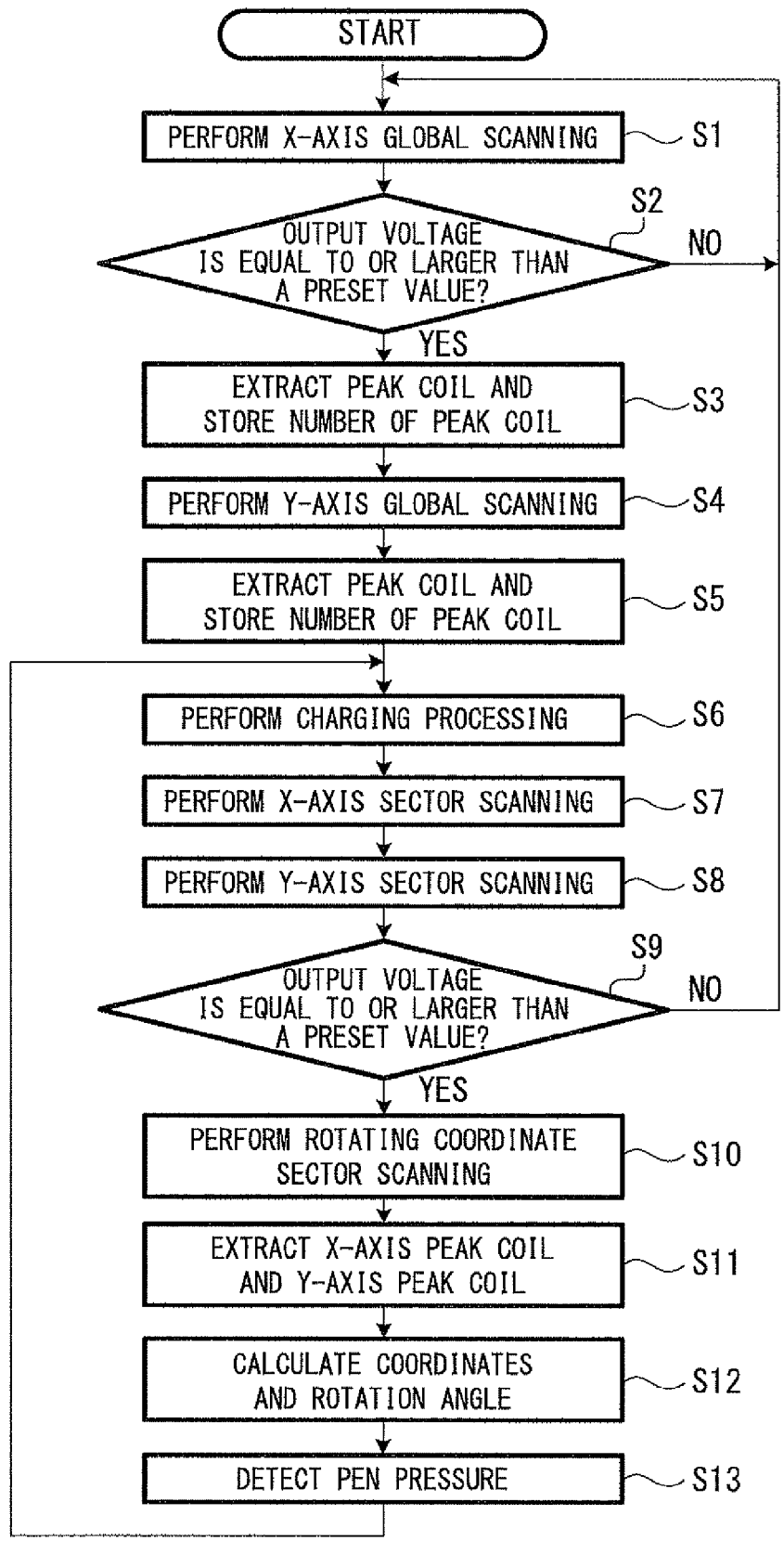
FIG. 7 is a flowchart showing processes executed by a processing portion of the position detecting device of the input device according to the aforesaid embodiment.
Figure 8:
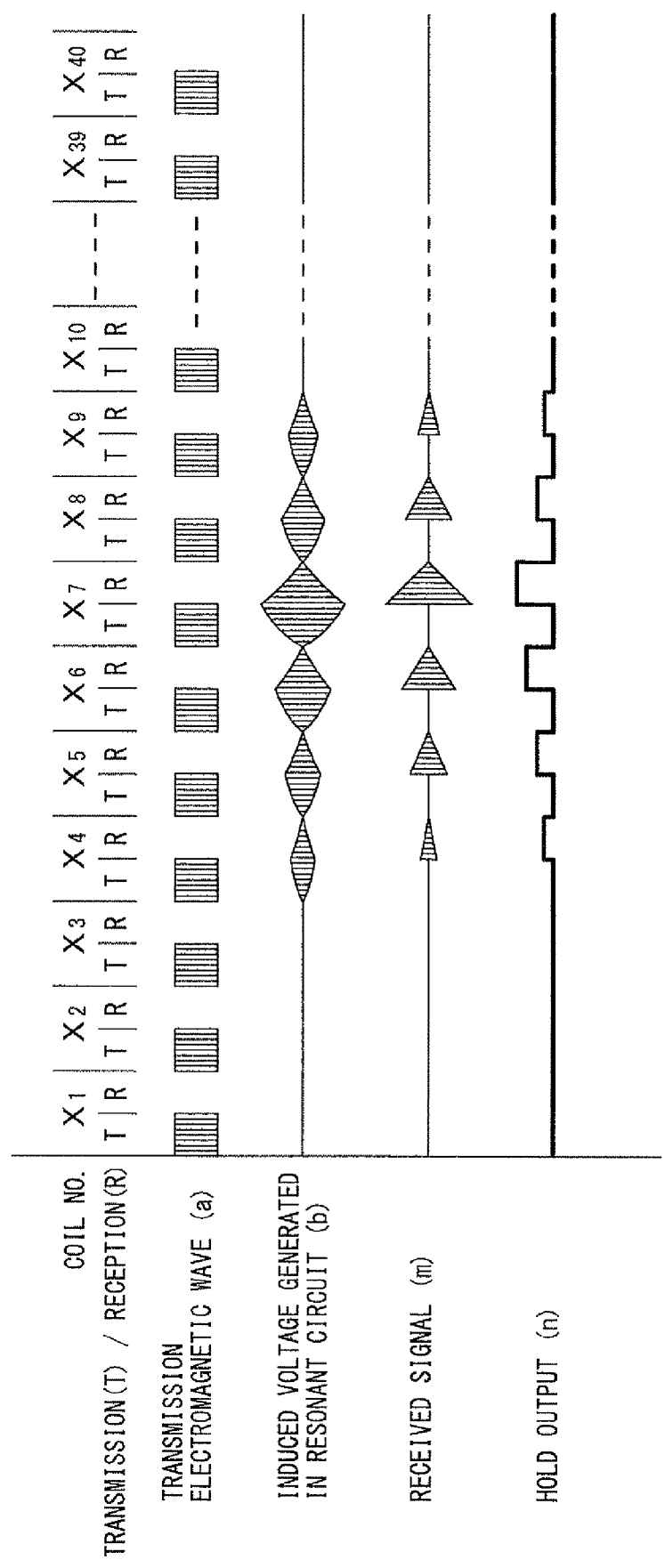
FIG. 8 is a waveform diagram showing an example of waveforms of the respective sections of the position detecting device of the input device according to the aforesaid embodiment while performing an X-axis global scanning.

FIG. 7 is a flowchart showing processes executed by the processing portion 25 of the position detecting device 1. FIG. 8 is a waveform diagram showing the waveforms of the respective sections while sequentially scanning the respective loop coils of the X-axis direction loop coil group 11a.

First, the processing portion 25 sequentially scans/selects the respective loop coils of the X-axis direction loop coil group 11a (Step S1) in order to detect whether or not the position indicator 2 is located near the detection section 4 of the position detecting device 1. The operation of sequentially scanning/selecting the loop coils is referred to as "global scanning" hereinafter.

The global scanning (X-axis global scanning) will be described below with reference to FIG. 8. Incidentally, when performing the global scanning, the switches 54, 55 are in open state.

The processing portion 25 sends information to the selecting circuit 12 to make it select a first loop coil (loop coil $X_1$, for example) from the X-axis direction loop coil group 11a, and sends a signal to the switching circuit 15 to make it select the transmission side terminal T. Thus, a sinusoidal signal having the frequency f0 is supplied from the oscillator 13 to the loop coil $X_1$, and a transmission electromagnetic wave (a) having the frequency f0 is generated by the loop coil $X_1$.

After the processing portion 25 sends the signal to the switching circuit 15 to make it select the transmission side terminal T for a predetermined period, a signal whose amplitude gradually increases with the lapse of time is generated in the resonant circuit 51 of the position indicator 2. Next, the processing portion 25 sends a signal to the switching circuit 15 to make it select the reception side terminal R. Accordingly transmission of the signal from the loop coil $X_1$ is stopped. However, the signal in the resonant circuit 51 attenuates gradually with the lapse of time, instead of disappearing immediately. In the meantime, a signal whose level varies corresponding to the signal in the resonant circuit 51 is induced in the loop coil $X_1$. The signal generated in the loop coil $X_1$ is supplied to the receiving amplifier 16 through the switching circuit 15.

After the processing portion 25 sends the signal to the switching circuit 15 to make it select the reception side terminal R for a predetermined period, the processing portion 25 makes the selecting circuit 12 select a second loop coil (loop coil $X_2$, for example) from the X-axis direction loop coil group 11a. Further, the processing portion 25 sends information to make the switching circuit 15 select the transmission side terminal T. Next, the processing portion 25 sends a signal to the switching circuit 15 to make it select the reception side terminal R and thereby receive a signal induced in the loop coil $X_2$ in the same manner as described above.

Thereafter, the processing portion 25 performs the similar processing to sequentially scan/select 3rd to 40th loop coils (loop coils $X_3$ to $X_{40}$, for example) of the X-axis direction loop coil group 11a. As a result, transmission/reception of the electromagnetic wave is performed on each of loop coils $X_3$ to $X_{40}$. At this time, if the position indicator 2 approaches or contacts the input surface 4a of the position detecting device 1, the resonant circuit 51 having the first coil 35 will be excited by the transmission electromagnetic wave (a) generated by the loop coil $X_1$ closest to the position indicator 2. As a result, an induced voltage (b) having the frequency f0 is generated in the resonant circuit 51.

The present embodiment is based on an example in which every loop coil is scanned/selected. However, in the processing of Step S1, the processing portion 25 does not have to select every loop coil of the X-axis direction loop coil group 11a, but can select every other loop coil, every third loop coils, or the like. Further, transmission/reception of the electromagnetic wave may also be performed plural times on the selected loop coil. Furthermore, although it is preferred that the transmission time for each loop coil is equal and that the reception time for each loop coil is equal, the transmission time and the reception time do not have to be equal to each other.

The induced voltage, i.e., a received signal (m), generated in the loop coil of the X-axis direction loop coil group 11a during the reception period is detected by the detector 17, converted into the DC signal, and smoothed by the low-pass filter 18. Further, the signal output by the low-pass filter 18 is held by the S/H circuit 19 at a predetermined timing to become a hold output (n), the hold output (n) is converted into a digital value by the A/D conversion circuit 20, and the digital value is sent to the processing portion 25.

Here, the output level of the S/H circuit 19 depends on the distance between the position indicator 2 and the loop coil. Thus, the processing portion 25 determines whether or not the maximum value of the digital value output by the A/D conversion circuit 20 is equal to or larger than a preset value (Step S2), and thereby determines whether or not the position indicator 2 is located within an effective reading height range of the position detecting device 1.

In the processing of Step S2, if it is determined that the maximum value of the digital value output by the A/D conversion circuit 20 is smaller than the preset value, i.e., if it is determined that the position indicator 2 is not located within the effective reading height range (i.e., "NO" in Step S2), the processing portion 25 returns the processing to Step S1.

If it is determined that the position indicator 2 is located within the effective reading height range (i.e., "YES" in Step S2), the processing portion 25 extracts, among the loop coils $X_1$ to $X_{40}$, a loop coil causing the maximum value (referred to as a "peak coil" hereinafter), and stores the number of the peak coil (Step S3). In the illustrated example the number of the peak coil is $X_7$.

Next, the processing portion 25 sequentially scans/selects the respective loop coils of the Y-axis direction loop coil group 11b, i.e., the processing portion 25 performs Y-axis global scanning on the respective loop coils of the Y-axis direction loop coil group 11b (Step S4) to transmit/receive electromagnetic wave to/from the respective loop coils of the Y-axis direction loop coil group 11b.

Figure 9:
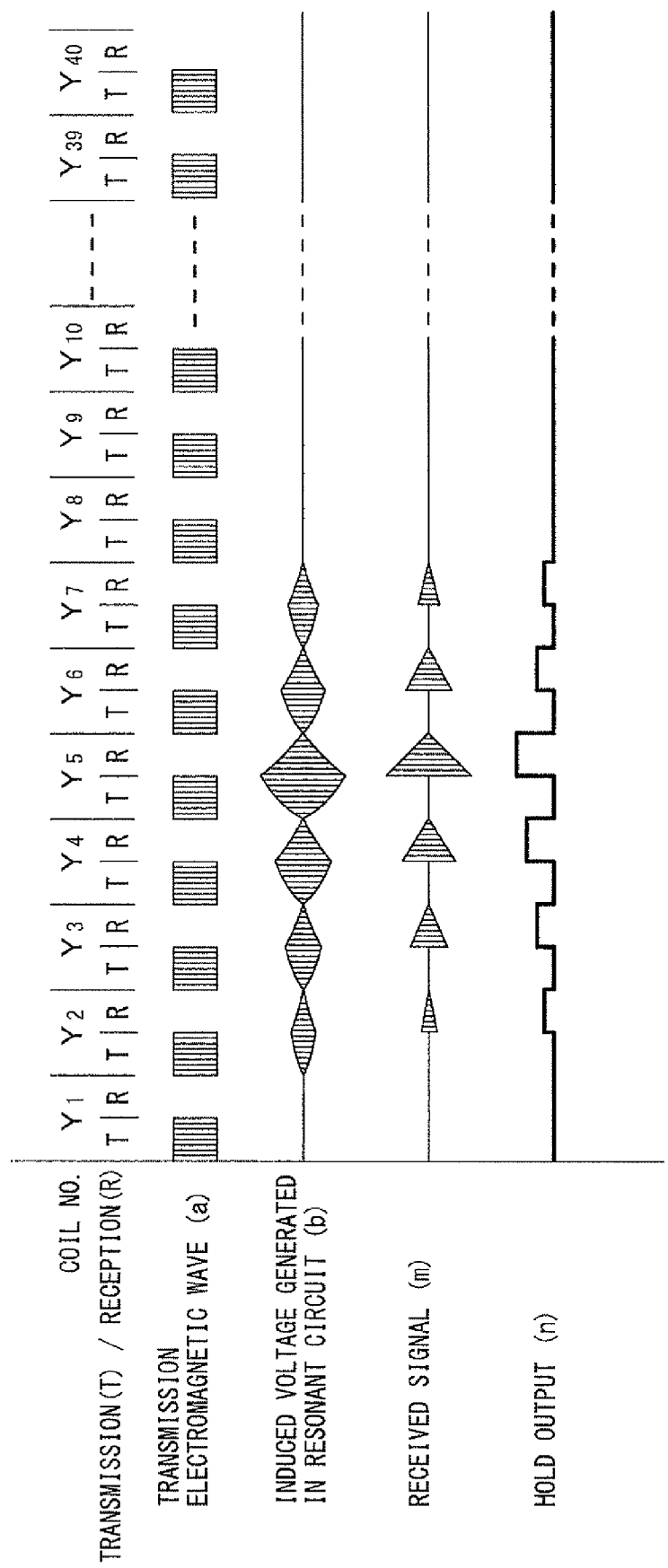
FIG. 9 is a waveform diagram showing an example of waveforms of the respective sections of the position detecting device of the input device according to the aforesaid embodiment while performing a Y-axis global scanning.

FIG. 9 is a waveform diagram showing an example of waveforms of the respective sections while performing a Y-axis global scanning. Signals (a), (b), (m), (n) shown in FIG. 9 are the same kind of signals as the signals (a), (b), (m), (n) shown in FIG. 8.

Next, the processing portion 25 extracts, among the loop coils $Y_1$ to $Y_{40}$, a loop coil causing the maximum value (referred to as a "peak coil" hereinafter), and stores the number of the peak coil (Step S5). In the illustrated example the number of the peak coil is $Y_5$.

Next, the processing portion 25 performs charging processing (Step S6). In the charging processing, the processing portion 25 sends a signal to the selecting circuit 12 to make it select the loop coil $X_7$ and a signal to the switching circuit 15 to make it select the transmission side terminal T.

Figure 10:
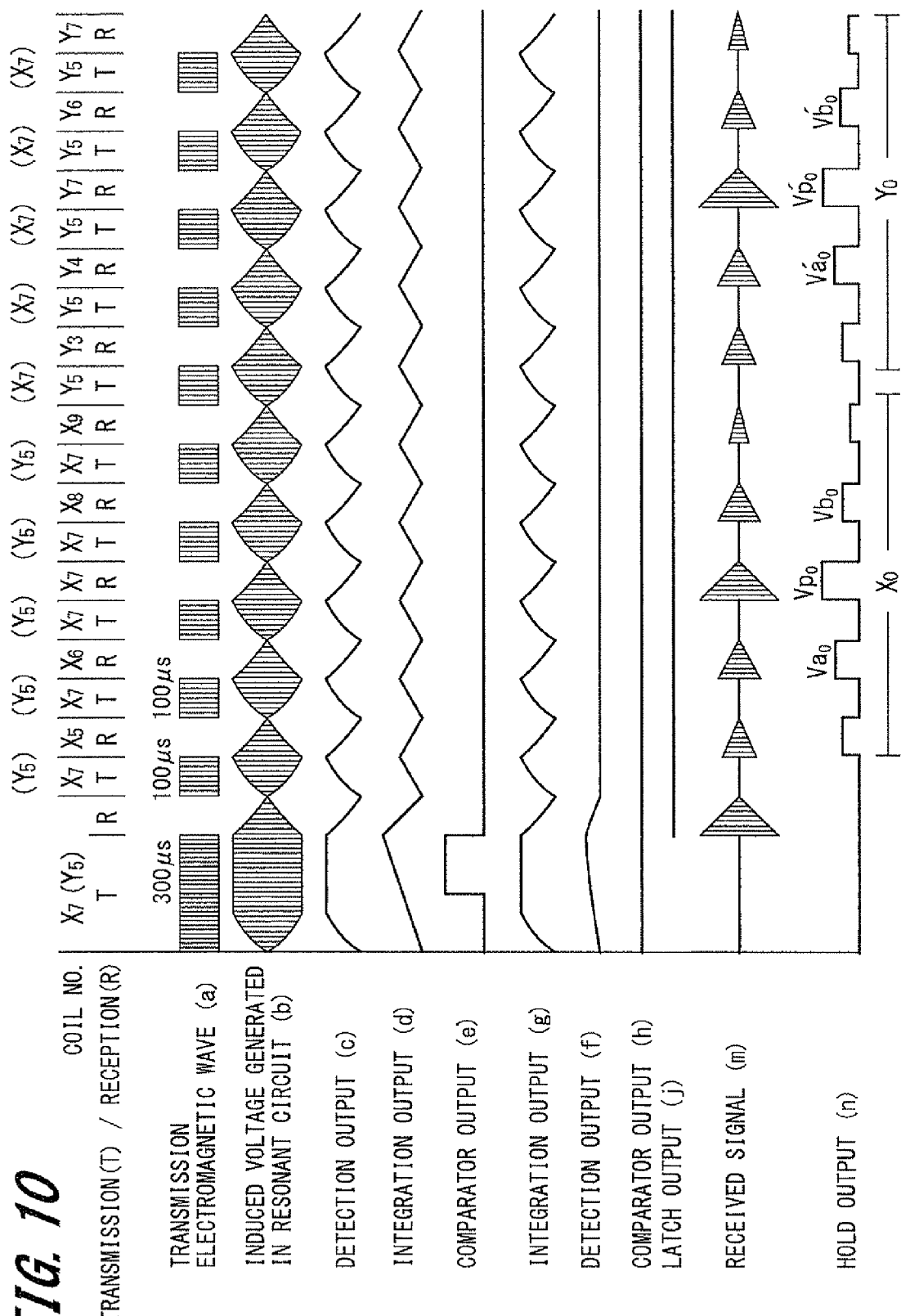
FIG. 10 is a waveform diagram showing an example of waveforms of the respective sections of the position detecting device of the input device according to the aforesaid embodiment while performing an X-axis sector scanning and a Y-axis sector scanning.

FIG. 10 is a waveform diagram showing an example of waveforms of the respective sections during the time from performing the charging processing operation (Step S6) to performing the Y-axis sector scanning operation (Step S8) shown in FIG. 7.

In the processing of Step S6, the processing portion 25 makes the loop coil $X_7$ send a transmission electromagnetic wave (a) to the position indicator 2 for a predetermined period T (T=300 µs in the present embodiment). Thus, an induced voltage (b) is generated in the resonant circuit 51 of the position indicator 2, and the power supply circuit 61 is charged by the induced voltage (b). The induced voltage (b) is input to the detection circuits 62, 63 respectively. As a result, a detection output (f) is output from the detection circuit 62, and a detection output (c) is output from the detection circuit 63.

When the detection output (c) is output, an integration output (d) and a comparator output (e) are output from the second path 58 (see FIG. 6). However, since the transmission time of the transmission electromagnetic wave (a) is 300 µs, no comparator output (h) is output from the first path 57 (see FIG. 6). Thus, no latch output (j) is output from the latch circuit 68, and the switches 54, 55 stay in the open state.

After a predetermined reception time R (R=100 µs in the present embodiment) has elapsed since completion of the transmission electromagnetic wave (a) whose transmission time is 300 µs, the processing portion 25 performs X-axis sector scanning (Step S7). Specifically, the processing portion 25 performs transmission/reception of the electromagnetic wave on a predetermined number of neighboring loop coils (for example, five loop coils) of the X-axis direction loop coil group 11a with the peak coil as the center.

In the transmission/reception operation of the electromagnetic wave, when the position detecting device 1 transmits the electromagnetic wave to the position indicator 2 (namely, when the switching circuit 15 selects the transmission side terminal T), the processing portion 25 constantly selects the peak coil (the loop coil $X_7$ in the present example). When the position indicator 2 receives the electromagnetic wave from the position detecting device 1 (namely when the switching circuit 15 selects the reception side terminal R), the processing portion 25 sequentially scans/selects (i.e., performs sector scanning) the loop coils (five loop coils in the present example) from the smallest coil number to the largest coil number (or from the largest coil number to the smallest coil number).

At this time, the resonant circuit 51 of the position indicator 2 is excited by the transmission electromagnetic wave (a), so that the induced voltage (b) is generated in the resonant circuit 51. The induced voltage (b) is input to the detection circuits 62, 63 respectively. As a result, the detection output (f) is output from the detection circuit 62, and the detection output (c) is output from the detection circuit 63.

The detection output (c) is integrated by the integrating circuit 65 to be output as the integration output (d). The integration output (d) is compared with the threshold voltage by the comparator 67. The detection output (f) is integrated by the integrating circuit 64 to be output as an integration output (g). The integration output (g) is compared with the threshold voltage by the comparator 66.

In the X-axis sector scanning, the transmission time of the transmission electromagnetic wave (a) is 100 µs. Thus, no comparator output (h) and comparator output (e) is output from the first path 57 and the second path 58 respectively (see FIG. 6). As a result, no latch output (j) is output from the latch circuit 68, and the switches 54, 55 stay in the open state.

When the switches 54, 55 are in the open state, an AC magnetic field will be generated by the induced voltage (b) generated in the resonant circuit 51, and the magnetic flux will evenly pass through the two magnetic cores 44, 45. Thus, at this time, the position of the position indicator 2 detected by the position detecting device 1 represents the center position (axial center) of the tubular core member 34.

Hereinafter, the coordinates of the center position (axial center) of the tubular core member 34 will be referred to as the central coordinates $X_0, Y_0$.

In the present embodiment, the position indicator 2 indicates the loop coils $X_7, Y_5$ as the peak coils. Thus, in the X-axis sector scanning, when receiving the electromagnetic wave, a maximum received voltage $Vp_0$ is obtained by the loop coil $X_7$. Further, when receiving the electromagnetic wave, received voltages $Va_0, Vb_0$ are respectively obtained by loop coils $X_6, X_8$ located before and after the loop coils $X_7$.

After the X-axis sector scanning is completed, the processing portion 25 performs Y-axis sector scanning (Step S8). Specifically, the processing portion 25 performs transmission/reception of the electromagnetic wave on a predetermined number of loop coils (for example, five loop coils) of the Y-axis direction loop coil group 11b with the peak coil as the center.

In the transmission/reception operation of the electromagnetic wave, when transmitting electromagnetic wave (namely when the switching circuit 15 selects the transmission side terminal T), the processing portion 25 constantly selects the peak coil (the loop coil $X_7$ in the present example). When receiving the electromagnetic wave (namely when the switching circuit 15 selects the reception side terminal R), the processing portion 25 sequentially scans/selects (i.e., performs sector scanning) the loop coils (five loop coils in the present example) from the smallest coil number to the largest coil number (or from the largest coil number to the smallest coil number).

In the present embodiment, the position indicator 2 indicates the loop coils $X_7$, $Y_5$ as the peak coils. Thus, in the Y-axis sector scanning, when receiving the electromagnetic wave, a maximum received voltage $V'p_0$ is obtained by loop coil $Y_5$. Further, when receiving the electromagnetic wave, received voltages $V'a_0$, $V'b_0$ are respectively obtained by loop coils $Y_4$, $Y_6$ located before and after the loop coils $Y_5$.

After the Y-axis sector scanning is completed, the processing portion 25 determines whether or not the maximum received voltages $Vp_0$, $V'p_0$ detected in the processing of Steps S7 and S8 are equal to or larger than a preset value (Step S9). In other words, the processing portion 25 determines whether or not the position indicator 2 is located within the effective reading height range of the position detecting device 1.

In the processing of Step S9, if it is determined that the maximum received voltages are smaller than the preset value, i.e., if it is determined that the position indicator 2 is not located within the effective reading height range (i.e., "NO" in Step S9), the processing portion 25 returns the processing to Step S1.

If it is determined that the position indicator 2 is located within the effective reading height range (i.e., "YES" in step S9), the processing portion 25 performs a rotating coordinate sector scanning (Step S10).

Figure 11:
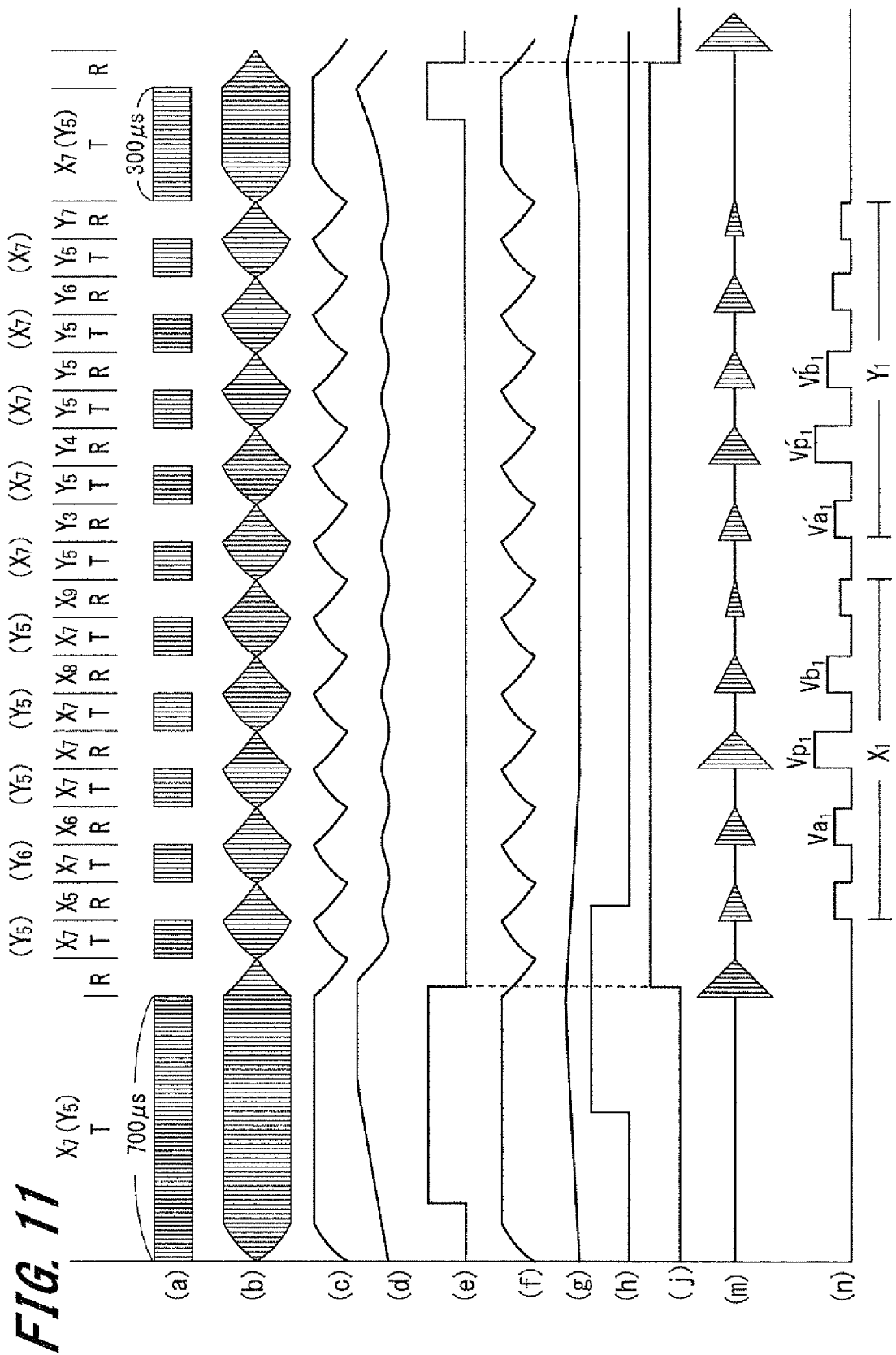
FIG. 11 is a waveform diagram showing an example of waveforms of the respective sections of the position detecting device of the input device according to the aforesaid embodiment while performing a rotating coordinate sector scanning.

FIG. 11 is a waveform diagram showing an example of waveforms of the respective sections while performing the rotating coordinate sector scanning. Signals (a) to (h), (j), (m), (n) shown in FIG. 11 are the same kind of signals as the signals (a) to (h), (j), (m), (n) shown in FIG. 10.

In the rotating coordinate sector scanning, the processing portion 25 sends a signal to the selecting circuit 12 to make it select the loop coil $X_7$, and sends a signal to the switching circuit 15 to make it select the transmission side terminal T. Further, the processing portion 25 makes the loop coil $X_7$ send a transmission electromagnetic wave (a) to the position indicator 2 for a predetermined period T (T=700 μs in the present example). The resonant circuit 51 of the position indicator 2 is excited by the transmission electromagnetic wave (a), so that an induced voltage (b) is generated. The power supply circuit 61 is charged by the induced voltage (b). Further, the induced voltage (b) is input to the detection circuits 62, 63 respectively. As a result, a detection output (f) is output from the detection circuit 62, and a detection output (c) is output from the detection circuit 63.

Here, in the second path 58 (see FIG. 6), when the transmission time of the transmission electromagnetic wave (a) exceeds 100 μs, a comparator output (e) will be output from the comparator 67 to the latch circuit 68. In the rotating coordinate sector scanning, since the transmission time of the transmission electromagnetic wave (a) is 700 μs, the comparator output (e) is output during the transmission period (for example, after an elapse of 200 μs) of the transmission electromagnetic wave (a).

Specifically, when the detection output (c) is supplied to the integrating circuit 65, an integration output (d) that rises at a predetermined time constant is output from the integrating circuit 65. Further, the integration output (d) is compared with the threshold voltage by the comparator 67, and if the value of the integration output (d) exceeds the threshold voltage, the comparator output (e) is output from the comparator 67.

In the first path 57 (see FIG. 6), when the transmission time of the transmission electromagnetic wave (a) exceeds 300 μs, a comparator output (h) will be output from the comparator 66 to the latch circuit 68. In the rotating coordinate sector scanning, since the transmission time of the transmission electromagnetic wave (a) is 700 μs, the comparator output (h) is output during the transmission period (for example, after an elapse of 400 μs) of the transmission electromagnetic wave (a).

The latch circuit 68 operates in response to the falling edge of the pulse of the comparator output (e), and the comparator output (h) at this time is output as a latch output (j). When the latch output (j) is output, the switches 54, 55 are closed.

After a predetermined reception time R (R=100 μs in the present embodiment) has elapsed since the completion of the transmission electromagnetic wave (a) whose transmission time is 700 μs, the processing portion 25 performs an X-axis sector scanning identical to the X-axis sector scanning performed in Step S7. Specifically, the processing portion 25 performs transmission/reception of electromagnetic wave on a predetermined number of neighboring loop coils (for example, five loop coils) of the X-axis direction loop coil group 11a with the peak coil as the center.

When the switch 55 is in the closed state, an electromotive force that opposes the change of the magnetic flux passing through the second magnetic core 45 will be generated in the second coil 36. Due to the generation of such a backward electromotive force, it becomes difficult for the magnetic field caused by the electromagnetic waves transmitted from the position detecting device 1 to pass through the inner side of the second coil 36 (i.e., the side of the second magnetic core 45). Thus, since the magnetic flux passing through the tubular core member 34 is biased to a side of the first magnetic core 44, the position of the position indicator 2 detected by the position detecting device 1 at this time is displaced to the side of the first magnetic core 44 relative to the center position (axial center) of the tubular core member 34.

Hereinafter, the coordinates corresponding to the position having been displaced to the side of the first magnetic core 44 relative to the center position of the tubular core member 34 will be referred to as rotating coordinates $X_n$, $Y_n$.

In the rotating coordinate sector scanning of the present embodiment, when receiving the electromagnetic wave, a maximum received voltage $Vp_1$ is obtained by the loop coil $X_7$. Further, when receiving the electromagnetic wave, received voltages $Va_1$, $Vb_1$ are respectively obtained by the loop coils $X_6$, $X_8$ located before and after the loop coil $X_7$.

After the rotating coordinate X-axis sector scanning is completed, the processing portion 25 performs a rotating coordinate Y-axis sector scanning identical to the Y-axis sector scanning performed in Step S8. Specifically, the processing portion 25 performs transmission/reception of the electromagnetic wave on a predetermined number of loop coils (for example, five loop coils) of the Y-axis direction loop coil group 11b with the peak coil as the center.

In the rotating coordinate Y-axis sector scanning, when receiving the electromagnetic wave, a maximum received voltage $V'p_1$ is obtained by the loop coil $Y_5$. Further, when receiving the electromagnetic wave, received voltages $V'a_1$, $V'b_1$ are respectively obtained by the loop coils $Y_4$, $Y_6$ located before and after the loop coil $Y_5$.

After the rotating coordinate sector scanning is completed, the processing portion 25 extracts the X-axis direction peak coil and Y-axis direction peak coil at which the maximum received voltages $Vp_0$, $V'p_0$ are respectively detected in the processing of Steps S7 and S8, and respectively stores the numbers of the respective peak coils (Step S11). The stored numbers of the respective peak coils are used to obtain the trajectory of the position indicator 2 moving on the input surface 4a.

Next, the processing portion 25 calculates the coordinate values of the position indicated by the position indicator 2 and the rotation angle of the position indicator 2 (Step S12). After that, the processing portion 25 detects the pen pressure based on a change in the capacitance of the variable capacitor 37 (Step S13). Then, as long as the position indicator 2 stays within the effective reading height range, the processing portion 25 repeats the processing of Steps S6 to S13. If it is determined that the position indicator 2 is not located within the effective reading height range, the processing portion 25 returns the processing to Step S1.

[Calculation of Coordinate Values]

Calculation of the coordinate values performed in the processing of Step S12 will be described below. In order to obtain the coordinate values, the central coordinates $X_0$, $Y_0$, which represents the coordinates of the center position (axial center) of the tubular core member 34, is calculated first.

$X_0$ is calculated using the following formula.

$$X_0 = P_X + \frac{D_1}{2} \times \frac{Vb_0 - Va_0}{Vp_0 \times 2 - Va_0 - Vb_0} \qquad \text{[Formula 1]}$$

where $P_x$ represents the center position of the loop coil at which the maximum received voltage $Vp_0$ is obtained, and $D_1$ represents the distance between the center positions of the X-axis direction loop coils.

$Y_0$ is calculated using the following formula.

$$Y_0 = P_Y + \frac{D_2}{2} \times \frac{V'b_0 - V'a_0}{V'p_0 \times 2 - V'a_0 - V'b_0} \qquad \text{[Formula 2]}$$

where $P_y$ represents the center position of the loop coil at which the maximum received voltage $V'p_0$ is obtained, and $D_2$ represents the distance between the center positions of the Y-axis direction loop coils.

Next, based on the center position of the loop coil at which the maximum received voltage is obtained, the maximum received voltage detected at said loop coil, and the received voltages detected at the loop coils located before and after said loop coil, the distribution of the received voltages is approximated to a quadratic curve, and accordingly the central coordinates $X_0$, $Y_0$ are interpolated. As a result, the coordinate values of the position indicated by the position indicator 2 are determined.

Figure 12:
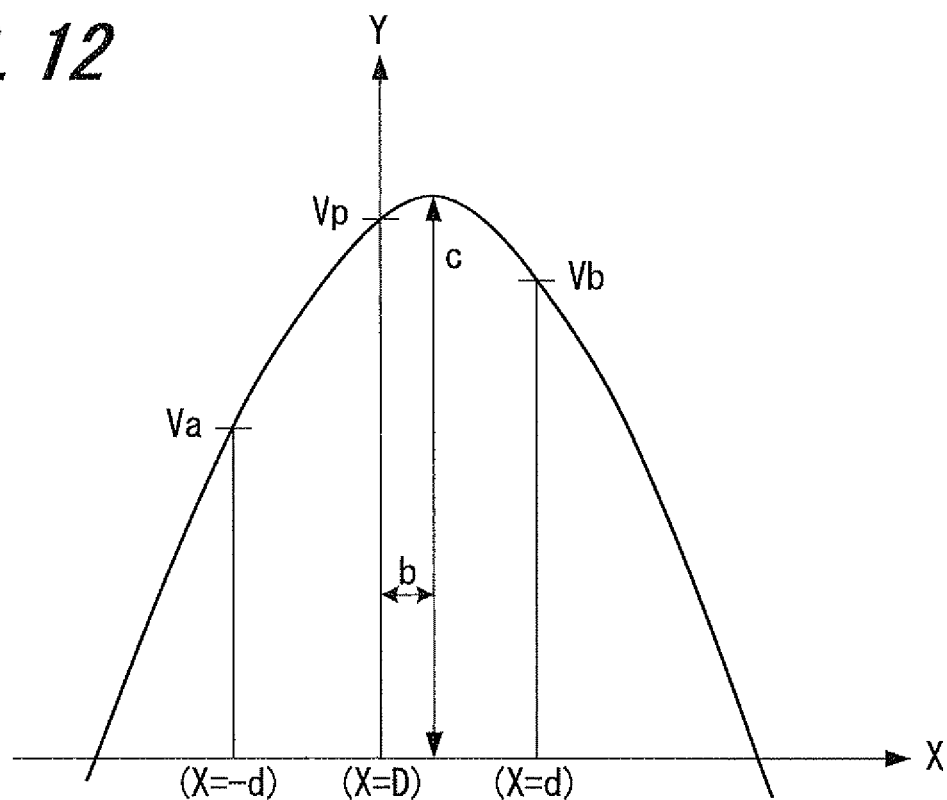
FIG. 12 explains a principle of coordinate interpolation performed by the position detecting device of the input device according to the aforesaid embodiment.

FIG. 12 explains a principle of the aforesaid coordinate interpolation.

In FIG. 12, X-axis represents the distance between the coils in a direction in which the coils are displaced from each other, and Y-axis represents the value of the received voltages. The distribution of the received voltages detected at the respective coils can be approximated to a quadratic curve shown in FIG. 12, and Va, Vb, Vp respectively represent the received voltages detected from three coils. Further, d is equivalent to the distance between the coils.

The quadratic curve shown in FIG. 12 is expressed by the following formula where a, b, c are constants.

$$y = a(x-b)^2 + c \qquad \text{[Formula 3]}$$

Correction value b of the central coordinates of the loop coil at which the maximum received voltage is detected can be obtained from Formula 3.

Since:

$Y = Vp$ when $x = 0$ $Y = Va$ when $x = -d$ $Y = Vb$ when $x = d$ [Formula 4]

the following formulas can be obtained:

$$Va = a(-d-b)^2 + c = ad^2 + 2abd + ab^2 + c \qquad (1)$$

$$Vp = ab^2 + c \qquad (2)$$

$$Vb = a(d-b)^2 + c = ad^2 - 2abd + ab^2 + c \qquad (3)$$

the following formula can be obtained by subtracting (2) from (1):

$$Va - Vp = ad^2 + 2abd = ad(d+2b) \qquad (4)$$

the following formula can be obtained by subtracting (2) from (3):

$$Vb - Vp = ad^2 - 2abd = ad(d-2b) \qquad (5)$$

the following formula can be obtained by dividing (4) by (5):

$$\frac{Va - Vp}{Vb - Vp} = \frac{d + 2b}{d - 2b}$$

b can be obtained by developing the above formula $$b = \frac{d(Vb - Va)}{2(2Vp - Va - Vb)}$$

[Calculation of Rotation Angle]

Figure 13:
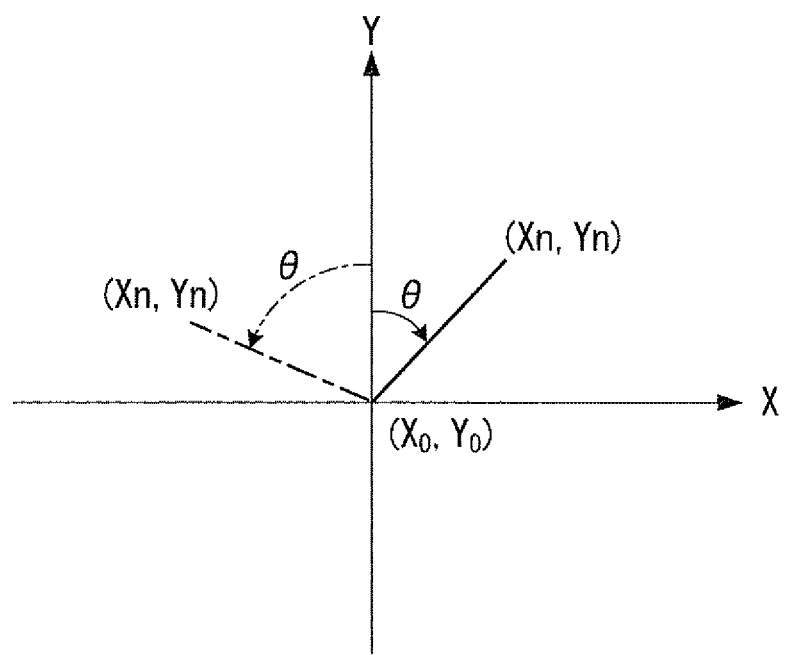
FIG. 13 explains a rotation angle calculated by the processing portion of the position detecting device of the input device according to the aforesaid embodiment.

Calculation of the rotation angle performed in the processing of Step S12 will be described below with reference to FIG. 13.

In order to calculate the rotation angle of the position indicator 2, the central coordinates $X_0$, $Y_0$ and the rotating coordinates $X_n$, $Y_n$ are obtained first. Since the calculation of the central coordinates $X_0$, $Y_0$ has been described above, it will not be described again here. The rotating coordinates $X_n$, $Y_n$ represent the coordinates corresponding to the position having been displaced to the side of the first magnetic core 44 relative to the center position of the tubular core member 34.

$X_n$ is calculated using the following formula.

$$X_n = P_X + \frac{D_1}{2} \times \frac{Vb_1 - Va_1}{Vp_1 \times 2 - Va_1 - Vb_1} \qquad \text{[Formula 5]}$$

where $P_x$ represents the center position of the loop coil at which the maximum received voltage $Vp_0$ is obtained, and $D_1$ represents the distance between the center positions of the X-axis direction loop coils.

$Y_n$ is calculated using the following formula.

$$Y_n = P_Y + \frac{D_2}{2} \times \frac{V'b_1 - V'a_1}{V'p_1 \times 2 - V'a_1 - V'b_1} \qquad \text{[Formula 6]}$$

where $P_y$ represents the center position of the loop coil where the maximum received voltage $V'p_1$ is obtained, and $D_2$ represents the distance between the center positions of the Y-axis direction loop coils.

Next, an X-Y coordinate system is established on the input surface 4a with the central coordinates $X_0$, $Y_0$ as the origin, wherein the X-axis and Y-axis of the X-Y coordinate system are respectively parallel to the X-axis and Y-axis of the input surface 4a. Further, the range of angle is set to $-180° < \theta \leq 180°$ with positive direction of the Y-axis as a reference ($\theta=0$). Thus, the angle $\theta$ of the rotating coordinates $X_n$, $Y_n$ is determined as the rotation angle $\theta$ of the position indicator 2.

When $Y_n = Y_0$ and $X_n > X_0$, the rotation angle $\theta$ of the position indicator 2 becomes 90° (i.e., $\theta = 90°$).

When $Y_n = Y_0$ and $X_n < X_0$, the rotation angle $\theta$ of the position indicator 2 becomes 90° (i.e., $\theta = 90°$).

When $Y_n > Y_0$, the rotation angle $\theta$ of the position indicator 2 is calculated using the following formula.

$$\theta = \tan^{-1}\left(\frac{X_n - X_0}{Y_n - Y_0}\right) \quad \text{[Formula 7]}$$

When $Y_n < Y_0$ and $X_n \geq X_0$, the rotation angle $\theta$ of the position indicator 2 is calculated using the following formula.

$$\theta = 180° + \tan^{-1}\left(\frac{X_n - X_0}{Y_n - Y_0}\right) \quad \text{[Formula 8]}$$

When $Y_n < Y_0$ and $X_n < X_0$, the rotation angle $\theta$ of the position indicator 2 is calculated using the following formula.

$$\theta = -180° + \tan^{-1}\left(\frac{X_n - X_0}{Y_n - Y_0}\right) \quad \text{[Formula 9]}$$

Advantages of the First Embodiment

The position indicator 2 of the present embodiment includes the tubular core member 34 having the through-hole 34a formed therein. The tubular core member 34 is formed by combining the first magnetic core 44 and the second magnetic core 45 such that they face each other in a direction perpendicular to the axial direction of the case 31. Thus, it is possible to pass the rod 32 through the through-hole 34a, so that the conductive member of the variable capacitor 37 can be moved by the end portion of the rod 32. As a result, the pressure applied to the pen tip (of the rod 32) changes the capacitance of the variable capacitor 37, and the pen pressure can be detected based on the change of the capacitance of the variable capacitor 37.

With the configuration of the position indicator 2 described above, the outer diameter of the case 31, which forms the exterior part of the position indicator 2, can be reduced compared with the configuration in which two cylindrical magnetic cores are disposed side by side.

In the position indicator 2 of the present embodiment, the first coil 35 is wound around the circumferential surface of the tubular core member 34, and the second coil 36 is wound around the second magnetic core 45. Further, the latch circuit 68 of the position indicator 2 controls opening/closing of the second coil 36 based on the transmission time of the transmission electromagnetic wave transmitted by the position detecting device 1.

When the second coil 36 is in the open state, the coordinate values detected by the position detecting device 1 represent the coordinates of the center position (axial center) of the tubular core member 34. When the second coil 36 is in the closed state, the magnetic flux becomes difficult to pass through the second magnetic core 45 around which the second coil 36 is wound, so that the magnetic flux is biased to a side of the first magnetic core 44. Thus, the coordinate values detected by the position detecting device 1 are displaced to the side of the first magnetic core 44 from the center position (axial center) of the tubular core member 34. Therefore, the rotation angle with respect to the axial center of the position indicator 2 can be detected based on the coordinate values of the center position (axial center) of the tubular core member 34 and the coordinate values displaced to the side of the first magnetic core 44.

In the position indicator 2 of the present embodiment, the second coil 36 is wound so that the second coil 36 is curved along the concave surface 45d of the second magnetic core 45. Because of this feature, even if the diameter of the rod 32 and the diameter of the through-hole 34a of the tubular core member 34 are substantially equal, there is no concern that the rod 32 would interfere with the second coil 36. Further, since the second coil 36 adheres closely to the second magnetic core 45, the magnetic flux passing through the second magnetic core 45 can be increased, and therefore performance can be improved.

In the illustrated example, the first magnetic core 44 and the second magnetic core 45 are formed so as to be symmetrical relative to the axial center of the tubular core member 34. Because of this feature, only a single type of the magnetic core is needed, so that production efficiency can be improved.

3. Modifications

The present invention is not limited to the above embodiment but includes various modifications without departing from the spirit of the present invention. For example, although the variable capacitor 37 is used as the pen-pressure detecting circuit in the aforesaid embodiment, the pen-pressure detecting circuit of the present invention may also comprise a pressure sensor. In this case, the position indicator should be provided with a processing unit (such as a CPU) to convert the pen pressure detected by the pressure sensor into pen pressure information.

Further, although the tubular core member 34 of the position indicator 2 of the aforesaid embodiment is formed in a hollow cylindrical shape having a generally cylindrical (or polygonal) through-hole, the tubular core member may take other shapes, such as a hollow polygonal prism shape (for example, a hollow quadrangular prism shape, a hollow triangular prism shape or the like) having a generally polygonal (or cylindrical) through-hole, as long as the tubular core member has a tubular shape with a through-hole for passing the rod 32 therethrough.

Still further, although the tubular core member 34 is formed by the first magnetic core 44 having the concave surface 44d formed therein and the second magnetic core 45 having the concave surface 45d formed therein in the position indicator 2 of the aforesaid embodiment, the tubular core member according to the present invention may also be configured by a first magnetic core and a second magnetic core wherein a concave surface is formed in either one of the first magnetic core and second magnetic core.

Figure 14A:
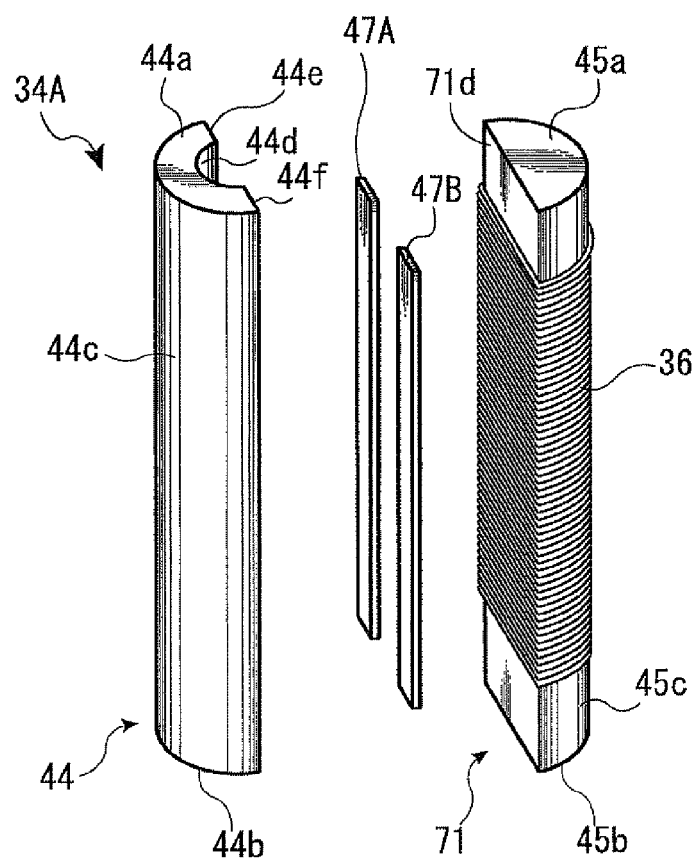
FIG. 14A is a perspective view showing a first modification of the tubular core member of the position indicator.

FIG. 14A is a perspective view showing a first modification of the tubular core member according to the present invention. A tubular core member 34A includes a first magnetic core 44 and a second magnetic core 71. The second magnetic core 71 has a substantially semicircular shaped cross section in the transversal direction (the direction perpendicular to the longitudinal direction). In other words, the second magnetic core 71 has a flat surface 71d facing the concave surface 44d and the flat surfaces 44e, 44f of the first magnetic core 44.

Surfaces other than the flat surface 71d of the second magnetic core 71 are identical to those of the second magnetic core 45 previously described (see FIG. 5). Thus, the surfaces other than the flat surface 71d of the second magnetic core 71 are denoted by the same numerals as those of the second magnetic core 45, and explanation thereof will be omitted.

The tubular core member 34A has a substantially semicircular shaped through-hole formed by the concave surface 44d of the first magnetic core 44 and the flat surface 71d of the second magnetic core 71, and the rod is inserted into the through-hole.

Figure 14B:
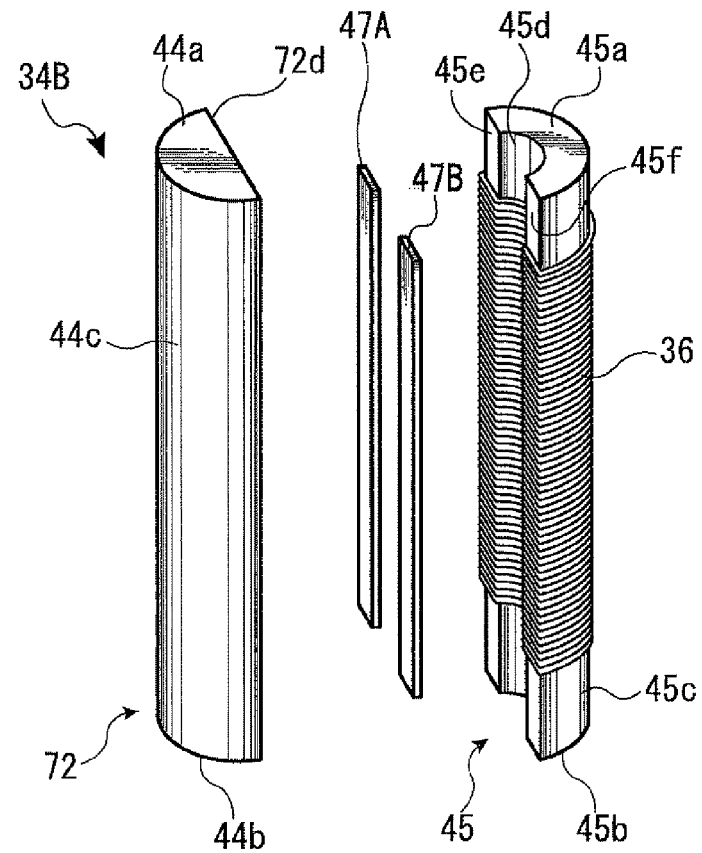
FIG. 14B is a perspective view showing a second modification of the tubular core member of the position indicator according to the present invention.

FIG. 14B is a perspective view showing a second modification of the tubular core member according to the present invention. A tubular core member 34B includes a first magnetic core 72 and the second magnetic core 45. The first magnetic core 72 has a flat surface 72d facing the concave surface 45d and the flat surfaces 45e, 45f of the second magnetic core 45.

Surfaces other than the flat surface 72d of the first magnetic core 72 are identical to those of the first magnetic core 44 previously described (see FIG. 5). Thus, the surfaces other than the flat surface 72d of the first magnetic core 72 are denoted by the same numerals as those of the first magnetic core 44, and explanation thereof will be omitted.

The tubular core member 34B has a substantially semicircular shaped through-hole formed by the flat surface 72d of the first magnetic core 72 and the concave surface 45d of the second magnetic core 45, and the rod is inserted into the through-hole.

What is claimed is:

1. A position indicator comprising:
    a tubular core member formed by combining a substantially bar-like first magnetic core and a substantially bar-like second magnetic core such that they face each other in a transversal direction thereof to form a through-hole therebetween;
    a first coil wound around the tubular core member;
    a second coil wound around the second magnetic core;
    a substantially bar-like rod inserted into the through-hole of the tubular core member and adapted to indicate a position of the position indicator;
    a pen-pressure detecting element for detecting a pressure applied to an end of the rod;
    a capacitor connected to the first coil to form a resonant circuit; and
    a switch for controlling "on" and "off" states of the second coil,
    wherein at least one of the first magnetic core and the second magnetic core has a recessed portion formed therein, the recessed portion extending in the axial direction of the at least one of the first magnetic core and the second magnetic core so as to form the through-hole.

2. The position indicator according to claim 1, wherein the recessed portions are formed in both the first magnetic core and the second magnetic core, and the recessed portions of the first magnetic core and the recessed portion of the first magnetic core face each other so as to form the through-hole.

3. The position indicator according to claim 2, wherein the second coil is wound so that it is curved along the recessed portion of the second magnetic core.

4. The position indicator according to claim 3, wherein the tubular core member is formed in substantially a hollow cylindrical shape.

5. The position indicator according to claim 1, wherein the tubular core member is formed in substantially a hollow polygonal shape.

6. The position indicator according to claim 1, wherein the first coil and the second coil are wound so that ends of the first coil and ends of the second coil are arranged at a side of one end of the tubular core member in the longitudinal direction.

7. The position indicator according to claim 1, wherein the second coil is wound so that it is curved along the recessed portion of the second magnetic core.

8. The position indicator according to claim 7, wherein the tubular core member is formed in substantially a hollow cylindrical shape.

9. The position indicator according to claim 1, wherein the first magnetic core and the second magnetic core are combined with each other through a spacer.

10. The position indicator according to claim 9, wherein the spacer is made of a nonmagnetic material.

11. The position indicator according to claim 10, wherein the spacer is an insulating material.

12. The position indicator according to claim 1, wherein the pen-pressure detecting element comprises a variable capacitor.

13. The position indicator according to claim 1, wherein the pen-pressure detecting element comprises a pressure sensor.

14. A circuit component comprising:
    a tubular core member formed by combining a substantially bar-like first magnetic core and a substantially bar-like second magnetic core such that they face each other in a transversal direction thereof to form a through-hole therebetween;
    a first coil wound around the tubular core member; and
    a second coil wound around the second magnetic core;
    wherein at least one of the first magnetic core and the second magnetic core has a recessed portion formed therein, the recessed portion extending in the axial direction of the at least one of the first magnetic core and the second magnetic core so as to form the through-hole.

15. The circuit component according to claim 14, wherein the tubular core member is formed in substantially a hollow cylindrical shape.

16. The circuit component according to claim 14, wherein the tubular core member is formed in substantially a hollow polygonal shape.

17. An input device comprising:
    (a) a position indicator comprising:
        a tubular core member formed by combining a substantially bar-like first magnetic core and a substantially bar-like second magnetic core such that they face each other in a transversal direction thereof to form a through-hole therebetween;
        a first coil wound around the tubular core member;
        a second coil wound around the second magnetic core;
        a substantially bar-like rod inserted into the through-hole of the tubular core member and adapted to indicate a position of the position indicator;
        a pen-pressure detecting element for detecting a pressure applied to an end of the rod;
        a capacitor connected to the first coil to form a resonant circuit; and
        a switch for controlling "on" and "off" states of the second coil,
        wherein at least one of the first magnetic core and the second magnetic core has a recessed portion formed therein, and the recessed portion extending in the axial direction of the at least one of the first magnetic core and the second magnetic core so as to form the through-hole, and (b) a position detecting device comprising:
an input surface on which the position indicator indicates a position;
a coordinate input circuit configured to obtain coordinates of the position indicated on the input surface based on distribution of a magnetic field emitted from the tubular core member of the position indicator; and
a rotation angle calculating circuit for calculating a rotation angle of the position indicator about an axis in a direction perpendicular to the input surface based on coordinates obtained when the switch is "on" and in the closed state and coordinates obtained when the switch is "off" and in the open state.

* * * * *

UNITED STATES PATENT AND TRADEMARK OFFICE
CERTIFICATE OF CORRECTION

| | | |
|---|---|---|
| PATENT NO. | : 8,212,550 B2 | Page 1 of 1 |
| APPLICATION NO. | : 12/684428 | |
| DATED | : July 3, 2012 | |
| INVENTOR(S) | : Yuji Katsurahira et al. | |

It is certified that error appears in the above-identified patent and that said Letters Patent is hereby corrected as shown below:

Column 20, Line 31:
"a second coil wound around the second magnetic core;" should read, --a second coil wound around the second magnetic core,--.

Signed and Sealed this
Twenty-eighth Day of August, 2012

David J. Kappos
*Director of the United States Patent and Trademark Office*